United States Patent
Omori et al.

(10) Patent No.: US 8,137,795 B2
(45) Date of Patent: *Mar. 20, 2012

(54) INDEXABLE INSERT

(75) Inventors: Naoya Omori, Itami (JP); Yoshio Okada, Itami (JP); Minoru Itoh, Itami (JP); Susumu Okuno, Itami (JP); Shinya Imamura, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 739 days.

This patent is subject to a terminal disclaimer.

(21) Appl. No.: 12/094,454

(22) PCT Filed: Oct. 30, 2006

(86) PCT No.: PCT/JP2006/321645
§ 371 (c)(1),
(2), (4) Date: May 21, 2008

(87) PCT Pub. No.: WO2007/058065
PCT Pub. Date: May 24, 2007

(65) Prior Publication Data
US 2009/0269150 A1    Oct. 29, 2009

(30) Foreign Application Priority Data
Nov. 21, 2005   (JP) .................................. 2005-336125

(51) Int. Cl.
*B23B 27/14*   (2006.01)
(52) U.S. Cl. ............ 428/216; 51/307; 51/309; 428/336; 428/698; 428/701; 428/702; 428/704
(58) Field of Classification Search .................... 51/307, 51/309; 428/216, 336, 698, 701, 702, 704; 407/119
See application file for complete search history.

(56) References Cited

U.S. PATENT DOCUMENTS
4,895,770 A * 1/1990 Schintlmeister et al. ..... 428/704
(Continued)

FOREIGN PATENT DOCUMENTS
FR    2370551    *   7/1978
(Continued)

OTHER PUBLICATIONS

Japanese Office Action for corresponding JP Application No. 2005-336125, dated Apr. 19, 2011, pp. 1-4, Japan.

*Primary Examiner* — Archene Turner
(74) *Attorney, Agent, or Firm* — Ditthavong Mori & Steiner, P.C.

(57) ABSTRACT

An indexable insert (1) includes a substrate (8) and a coating layer formed on the substrate. The coating layer includes an inner layer and an outer layer. The inner layer is constituted by a layer containing at least one element selected from the group consisting of Group IVa elements, Group Va elements, and Group VIa elements in the periodic table, and Al and Si. The uppermost layer of the inner layer in contact with the outer layer is composed of a compound at least containing Ti and at least one of nitrogen and boron. The outer layer is constituted by an alumina layer or an alumina-containing layer. In a region involved in cutting, the outer layer satisfies $B/A \leqq 0.9$ where A μm is the average thickness at the flank face (3) side and B μm is the average thickness at the rake face (2) side.

12 Claims, 6 Drawing Sheets

U.S. PATENT DOCUMENTS

| | | | |
|---|---|---|---|
| 5,431,072 A * | 7/1995 | Christoffel | 407/119 |
| 6,187,421 B1 | 2/2001 | Moriguchi et al. | |
| 6,790,543 B2 * | 9/2004 | Kubota et al. | 428/701 |
| 7,087,295 B2 * | 8/2006 | Okada et al. | 428/216 |
| 7,090,914 B2 * | 8/2006 | Yamagata et al. | 428/336 |
| 7,695,222 B2 * | 4/2010 | Omori et al. | 407/119 |

FOREIGN PATENT DOCUMENTS

| | | |
|---|---|---|
| JP | 56-42412 B2 | 10/1981 |
| JP | 6-79502 A | 3/1994 |
| JP | 11-124672 A | 5/1999 |
| JP | 11-131235 A | 5/1999 |
| JP | 11-140647 A | 5/1999 |
| JP | 11-267905 A | 10/1999 |
| JP | 2001-347403 A | 12/2001 |
| JP | 2004-122263 A | 4/2004 |
| JP | 2004-122264 A | 4/2004 |
| JP | 2004-216488 A | 8/2004 |
| JP | 2005-103658 * | 4/2005 |
| WO | WO 03/061885 A1 | 7/2003 |
| WO | PCT/JP2006/321645 | 1/2007 |

* cited by examiner

INDEXABLE INSERT

TECHNICAL FIELD

The present invention relates to indexable inserts (also known as throw-away tips).

BACKGROUND ART

Indexable inserts detachably mountable to tools for cutting workpieces have been known to date. Many proposals of such indexable inserts in which a hard coating film of a ceramic or the like is formed on a substrate composed of a cemented carbide or cermet to improve wear resistance and toughness have been made.

For such indexable inserts having the above-described structure, various attempts have been made, such as changing the composition of the hard coating film or changing the thickness of the hard coating film from a flank face to a rake face, to improve various characteristics (refer to Japanese Unexamined Patent Application Publication Nos. 2001-347403 (Patent Document 1), 2004-122263 (Patent Document 2), 2004-122264 (Patent Document 3), and 2004-216488 (Patent Document 4)).

However, although recent years saw increasing need for high-speed cutting and precision cutting, and high-efficiency cutting of difficult-to-cut materials, there have been developed no indexable insert that simultaneously achieves both high wear resistance and high toughness required for these types of cutting and that prevents separation of the surface layer.

[Patent Document 1] Japanese Unexamined Patent Application Publication No. 2001-347403
[Patent Document 2] Japanese Unexamined Patent Application Publication No. 2004-122263
[Patent Document 3] Japanese Unexamined Patent Application Publication No. 2004-122264
[Patent Document 4] Japanese Unexamined Patent Application Publication No. 2004-216488

DISCLOSURE OF INVENTION

Problems to be Solved by the Invention

The present invention has been made under the existing conditions described above and aims to provide indexable inserts in which both high wear resistance and high toughness are simultaneously achieved and separation of the surface layer is satisfactorily prevented. In particular, it aims to provide an indexable insert effective for cutting difficult-to-cut materials or high-speed cutting of gray iron that requires both toughness and wear-resistance at the flank face side.

Means for Solving the Problems

In order to overcome the above-described problems, the present inventors have extensively studied the state of contact between an indexable insert and a workpiece during cutting operation. As a result, the present inventors have found that, in a state of cutting where a peripheral portion of an edge line 4 of an indexable insert 1 is in contact with a workpiece 5 and a flank face 3 faces the workpiece 5 while a rake face 2 is located on the chip 6 side, two contradicting characteristics are required. Namely, it is advantageous for improving the toughness to decrease the thickness of a coating layer while it is advantageous for improving the wear resistance to increase the thickness of the coating layer. Furthermore, when a layer containing alumina is used as a surface layer of the coating layer, an advantageous effect of preventing welding of the workpiece is obtained, but the surface layer easily separates from an underlayer directly underneath, which is problem. Further studies have been conducted and it has been found that it is particularly advantageous to improve the wear resistance of the flank face for cutting gray iron at high speed or cutting a difficult-to-cut material and that the resistance to separation can be significantly improved by forming a layer having a particular composition as the underlayer of the alumina-containing layer. The present invention has been made on the basis of these findings and further investigations.

In other words, the present invention provides an indexable insert comprising a substrate and a coating layer formed on the substrate, in which the substrate has at least one flank face and at least one rake face; the flank face and the rake face are connected to each other with an edge line therebetween; the coating layer includes an inner layer constituted by one or more layers and an outer layer formed on the inner layer; the layer constituting the inner layer is composed of a compound containing at least one element selected from the group consisting of Group IVa elements, Group Va elements, and Group VIa elements in the periodic table, and Al and Si; and at least one element selected from the group consisting of carbon, nitrogen, oxygen, and boron, and the uppermost layer of the inner layer in contact with the outer layer is composed of a compound at least containing Ti and at least one of nitrogen and boron; the outer layer is constituted by an alumina layer or an alumina-containing layer, and in a region involved in cutting, the outer layer satisfies $B/A \leq 0.9$ where A μm is the average thickness at the flank face side and B μm is the average thickness at the rake face side.

The present invention also provides an indexable insert comprising a substrate and a coating layer formed on the substrate in which the substrate has at least two flank faces, at least one rake face, and at least one corner; the flank faces and the rake face are connected to one another with an edge line therebetween; the corner is the point of intersection of the two flank faces and the rake face; the coating layer includes an inner layer constituted by one or more layers and an outer layer formed on the inner layer; the layer constituting the inner layer is composed of a compound containing at least one element selected from the group consisting of Group IVa elements, Group Va elements, and Group VIa elements in the periodic table, and Al and Si; and at least one element selected from the group consisting of carbon, nitrogen, oxygen, and boron, and the uppermost layer of the inner layer in contact with the outer layer is composed of a compound at least containing Ti and at least one of nitrogen and boron; the outer layer is constituted by an alumina layer or an alumina-containing layer, and on a straight line that passes through the corner, bisects the angle formed on the rake face by the two flank faces constituting the corner, and extends from the rake face to an intersection line between the two flank faces, the outer layer satisfies $B/A \leq 0.9$, where the average thickness of a segment region 0.5 mm or more and 1 mm or less from the corner toward the flank face side is A μm and the average thickness of a segment region 0.5 mm or more and 1 mm or less from the corner toward the rake face side is B μm.

The compound at least containing titanium and at least one of nitrogen and boron is preferably titanium boronitride represented by $TiB_XN_Y$ (where X and Y are atom. % satisfying $0.001 < X/(X+Y) < 0.04$) or titanium oxyboronitride represented by $TiB_XN_YO_Z$ (where X, Y, and Z are atom. % satisfying $0.0005 < X/(X+Y+Z) < 0.04$ and $0 < Z/(X+Y+Z) < 0.5$).

The outer layer is preferably not formed or only partly formed on an edge line portion involved in cutting. The coating layer preferably has a thickness of 0.05 μm or more and 30 μm or less.

The substrate may be composed of any one of a cemented carbide, a cermet, a high-speed steel, a ceramic, a cubic boron nitride sintered compact, a diamond sintered compact, and a silicon nitride sintered compact.

The indexable insert may be used for drilling, end-milling, milling, turning, metal sawing, gear cutting, reaming, tapping, or crankshaft pin milling.

Advantages

The indexable insert of the present invention having the above-described structure can achieve high wear resistance and high toughness simultaneously and separation of the surface layer is highly successfully prevented. In particular, the indexable insert of the present invention is particularly effective for cutting difficult-to-cut materials and for high-speed cutting of gray iron that require both toughness and wear resistance at the flank face side.

REFERENCE NUMERALS

Figure 1:
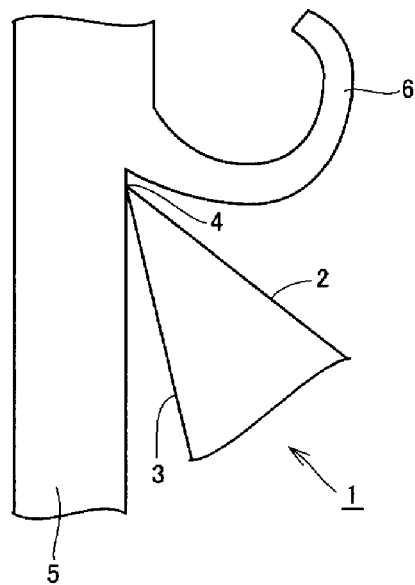
FIG. 1 is a schematic diagram showing a state of contact between an indexable insert and a workpiece during cutting.

1: indexable insert, 2: rake face, 3: flank face, 4: edge line, 5: workpiece, 6: chip, 7: through hole, 8: substrate, 9: corner, 11: coating layer, 12: inner layer, 13: outer layer

BEST MODES FOR CARRYING OUT THE INVENTION

The present invention will now be described in further detail. Note that in the embodiments described below with reference to the drawings, like or corresponding components are denoted by the same reference characters. The drawings are schematic drawings provided for explanation purposes only. The ratio of the thickness of the coating layer to the dimensions of the substrate and the ratio of the radii (R) of corners are different from actual ratios.

<Indexable Insert>

An indexable insert of the present invention includes a substrate and a coating layer formed on the substrate. The indexable insert of the present invention is particularly useful for drilling, end-milling, milling, turning, metal sawing, gear cutting, reaming, tapping, and crankshaft pin milling.

The present invention is effective for both negative and positive type indexable inserts either with or without chip breakers.

<Substrate>

As the material of the substrate of the present invention, any commonly known substrate for indexable inserts may be used without particular limitation. Examples of such materials include cemented carbides (e.g., WC-based cemented carbides and cemented carbides containing WC and Co and optionally a carbide, nitride, or carbonitride of Ti, Ta, Nb, or the like), cermet (mainly containing TiC, TiN, TiCN, or the like), high-speed steel, ceramics (titanium carbide, silicon carbide, silicon nitride, aluminum nitride, aluminum oxide, and mixtures thereof), cubic boron nitride sintered compacts, diamond sintered compacts, and silicon nitride sintered compacts.

The surface of the substrate may be modified. For example, when a cemented carbide is used, a β-free layer may be formed on a surface of the cemented carbide. When a cermet is used, a surface-hardened layer may be formed on the cermet. The advantages of the present invention can still be exhibited even when surface modification is performed as such.

The shape of the substrate may be any commonly known shape of a substrate used for such an indexable insert without any limitation. For example, the substrate may have a shape of a rhomboid, a square, a triangle, a circle, an ellipse, or the like in a cross-section taken in parallel to the substrate surface (upper surface).

Figure 2:
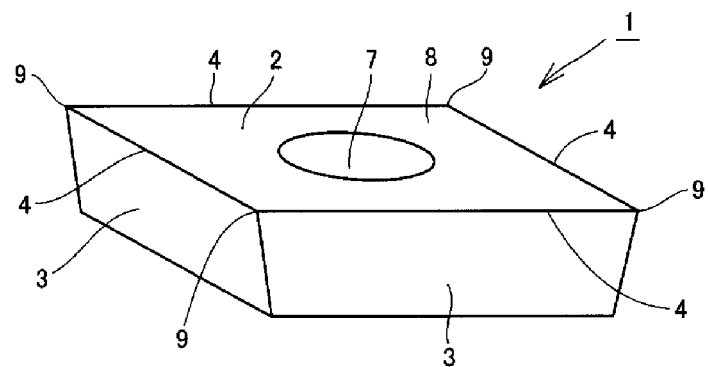
FIG. 2 is a schematic perspective view showing one example of the indexable insert of the present invention.

For example, as shown in FIG. 2, such a substrate 8 includes at least one flank face 3 and at least one rake face 2. The flank face 3 and the rake face 2 are connected to each other with an edge line 4 therebetween, and the edge line 4 is the central point of cutting action on the workpiece. More preferably, the substrate 8 includes at least two flank faces 3, at least one rake face 2, and at least one corner 9. The corner 9 is the intersection of the two flank faces 3 and the rake face 2 and serves as the most central point of cutting action.

The expressions such as "flank face", "rake face", "edge line", "corner", and the like include in their meanings not only portions on the surface of the substrate but also portions and faces in the outermost part of the indexable insert 1 and corresponding portions located on the surface and inside portions of layers such as inner and outer layers described below.

Although the edge line 4 is a straight line in FIG. 2, the shape of the edge line 4 is not limited to this and may be circumferential, undulant, curved, or bent. The edge line, the corner, and any other edge may be subjected to edge processing such as chamfering and/or radius-imparting on corners. As a result of edge processing, the edge line may not remain as a distinct line or the corner may not remain as a clear point of intersection. In such cases, the rake face and the flank face which have undergone the edge processing are geometrically extended on the basis of the state that existed before the edge processing so that the edge or point of intersection between these faces can be assumed to be a hypothetical edge that can be regarded as the edge line or a hypothetical point of intersection that can be regarded as the corner. It should also be noted that the expression "the rake face and the flank face are connected to each other with the edge line therebetween" and the expression "has the edge line" also apply to the cases where the edge line is subjected to the edge processing described above. The expression "two flank faces intersect one rake face" and the expression "the point of intersection forms a corner" also apply to the cases where the corner is subjected to the edge processing described above.

In FIG. 2, the rake face is illustrated as a flat face but may have any other structure, such as a structure having a chip breaker or the like, if necessary. The same applies to the flank face 3. Although the flank face 3 is illustrated as a flat face in FIG. 2, it may be chamfered (divided into two or more face regions), formed into a non-flat shape by any other method, curved, or formed into a structure having a chip breaker, if necessary.

Note that in the substrate of the present invention, a through hole 7 used as a fixing hole for fixing the indexable insert 1 to a tool may be formed to extend from the top face to the bottom face. If necessary, another fixing means may be provided in addition to or instead of the fixing hole.

<Coating Layer>

A coating layer 11 of the present invention is formed on the substrate 8 as shown in FIGS. 3 to 6, for example, and includes an inner layer 12 constituted by at least one layer (in the drawing, the inner layer 12 is illustrated as a single layer) and an outer layer 13 formed on the inner layer 12. The inner layer 12 and the outer layer 13 will be separately described below.

Figure 3:
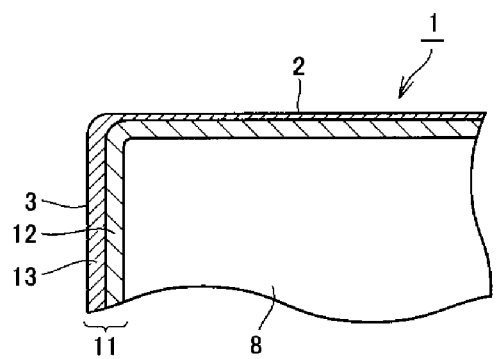
FIG. 3 is a schematic cross-sectional view of a negative type indexable insert having no chip breaker.
Figure 4:
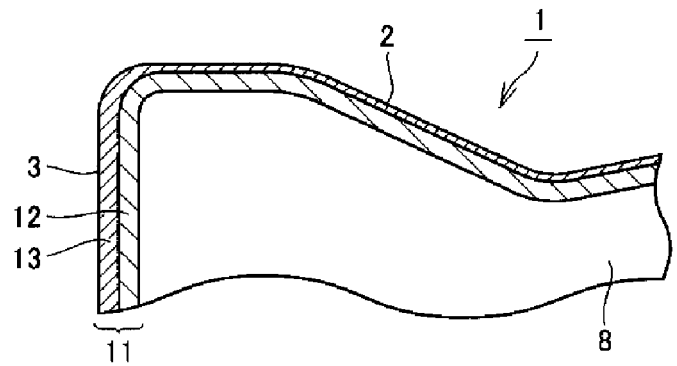
FIG. 4 is a schematic cross-sectional view of a negative type indexable insert having a chip breaker.
Figure 5:
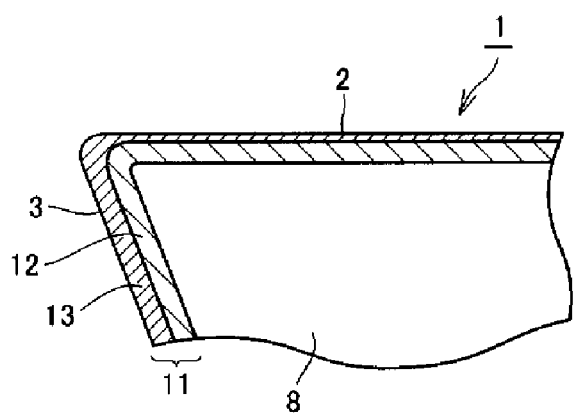
FIG. 5 is a schematic cross-sectional view of a positive type indexable insert having no chip breaker.
Figure 6:
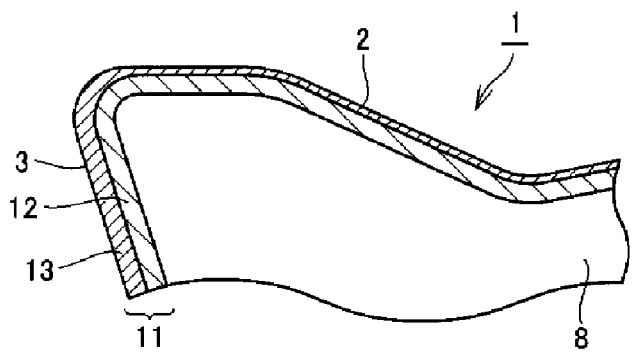
FIG. 6 is a schematic cross-sectional view of a positive type indexable insert having a chip breaker.

FIGS. 3 and 4 are schematic cross-sectional views showing sections of negative-type (the rake face 2 and the flank face 3 intersect at an angle of 90° or more) indexable inserts 1 without a chip breaker and with a chip breaker, respectively. FIGS. 5 and 6 are schematic cross-sectional views showing sections of positive-type (the rake face 2 and the flank face 3 intersect at an acute angle) indexable inserts 1 without a chip breaker and with a chip breaker, respectively.

The thickness of the coating layer (the total thickness of the inner layer and the outer layer) is preferably 0.05 μm or more and 30 μm or less. At a thickness less than 0.05 μm, the effect of improving characteristics such as wear resistance is not sufficiently exhibited. Once the thickness exceeds 30 μm, the characteristics do not much improve further and an economical disadvantage occurs thereby. If the economical aspect can be disregarded, the thickness may be set to 30 μm or more and the advantages of the present invention can still be exhibited. The thickness can be measured, for example, by cutting the indexable insert and observing the cross-section with a scanning electron microscope (SEM).

<Inner Layer>

The inner layer of the present invention is formed as one or more layers between the substrate and the outer layer described below. The inner layer has a function of improving various characteristics such as wear resistance and toughness of the indexable insert. It is usually preferable to form an inner layer covering the entire surface of the substrate.

Each layer constituting the inner layer may be composed of a compound containing at least one element selected from the group consisting of Group IVa elements (Ti, Zr, Hf, and the like), Group Va elements (V, Nb, Ta, and the like), and Group VIa elements (Cr, Mo, W, and the like) in the periodic table, and Al and Si; and at least one element selected from the group consisting of carbon, nitrogen, oxygen, and boron. As for the composition ratio (atomic ratio) of the compound, the atomic ratio of the former element to the latter element is not limited to 1:1 as has been commonly known. For example, the ratio of the latter element to the former element may be about 0.5-1 to 1 (for example, when the compound is $Ti_aN_b$ and a+b=100 atom. %, b is about 35 to 50 atom. %). When a plurality of elements are selected as the latter element, the atomic ratio between these elements is not necessarily limited to an equal ratio and any commonly known atomic ratio can be selected. Thus, in the embodiments and other sections below, the atomic ratio of the constituent elements of the compound described below may be any commonly known atomic ratio unless otherwise noted.

Specific examples of such a compound include TiC, TiN, TiCN, TiCNO, $TiB_2$, TiBN, TiBNO, TiCBN, ZrC, $ZrO_2$, HfC, HfN, TiAlN, AlCrN, CrN, VN, TiSiN, TiSiCN, AlTiCrN, TiAlCN, ZrCN, ZrCNO, AlN, AlCN, ZrN, and TiAlC.

Of these layers constituting the inner layer, the uppermost layer in contact with the outer layer described below must be composed of a compound at least containing titanium and at least one of nitrogen and boron. In this manner, separation of the outer layer described below, i.e., an alumina layer or an alumina-containing layer, can be particularly effectively prevented, which is a particularly advantageous effect. This is presumably because a particularly high degree of adhesion can be obtained between the layer composed of the compound at least containing titanium and at least one of nitrogen and boron and the alumina or alumina-containing layer.

It is known that in the existing art, a TiCN layer has been formed as the underlayer of the alumina or alumina-containing layer. The studies by the present inventors have found that separation of the alumina or alumina-containing layer is mainly caused by insufficient adhesion to the TiCN layer. The problem of insufficient adhesion caused by TiCN layer is overcome by employing the layer composed of the compound at least containing titanium and at least one of nitrogen and boron. Thus, TiCN is excluded from the compound at least containing titanium and at least one of nitrogen and boron.

Examples of the compound at least containing titanium and at least one of nitrogen and boron include TiN, TiBN, TiCBN, TiBNO, and TiCNO. These compounds may have non-stoichiometric compositions.

The compound is preferably titanium boronitride represented by $TiB_XN_Y$ (where X and Y are atom. % satisfying $0.001 < X/(X+Y) < 0.04$) or titanium oxyboronitride represented by $TiB_XN_YO_Z$ (where X, Y, and Z are atom. % satisfying $0.0005 < X/(X+Y+Z) < 0.04$ and $0 < Z/(X+Y+Z) < 0.5$). When these compounds are used, particularly high adhesion can be obtained on the alumina or alumina-containing layer.

In $TiB_XN_Y$ described above, high adhesion to the outer layer may not be exhibited when $X/(X+Y)$ is 0.001 or less. When $X/(X+Y)$ is 0.04 or more, the reactivity to the workpiece increases. Thus, when the layer is exposed, it reacts with the workpiece and the weld deposits tightly adhere on the edge, thereby possibly impairing the appearance of the workpiece. $X/(X+Y)$ is more preferably $0.003 < X/(X+Y) < 0.02$. The atomic ratio of Ti to the total of B and N in the above formula need not be 1:1 as previously described.

In $TiB_XN_YO_Z$ described above, when $X/(X+Y+Z)$ is 0.0005 or less, high adhesion to the outer layer may not be exhibited. At 0.04 or more, the reactivity to the workpiece increases, and when the layer is exposed, it reacts with the workpiece and the weld deposits may tightly adhere on the edge thereby possibly impairing the appearance of the workpiece. $X/(X+Y+Z)$ is more preferably $0.003<X/(X+Y+Z)<0.02$. When $Z/(X+Y+Z)$ is 0.5 or more, the toughness and the resistance to fracture may decrease although the hardness of the layer may increase. $Z/(X+Y+Z)$ is more preferably $0.0005<Z/(X+Y+Z)<0.3$. In the above formula, the atomic ratio of Ti to the total of B, N and O need not be 1:1.

The inner layer can be formed by a known chemical vapor deposition method (CVD method) or physical vapor deposition method (PVD method including a sputtering method and the like). The method for forming the inner layer is not particularly limited. For example, when the indexable insert is to be used for drilling or end-milling, the inner layer is preferably formed by the PVD method capable of forming the inner layer without decreasing the bending strength. The thickness of the inner layer is preferably controlled by adjusting the deposition time.

In forming the inner layer by the known CVD method, a layer formed by a medium temperature CVD (MT-CVD) method is preferably included. Most preferably, a titanium carbonitride (TiCN) layer formed by this method and having excellent wear resistance is included. Whereas deposition is conducted at about 1020° C. to 1030° C. according to the conventional CVD method, deposition can be conducted at a relatively low temperature of about 850° C. to 950° C. according to the MT-CVD method. Thus, the damage on the substrate caused by heat during deposition can be reduced. Accordingly, the layer formed by the MT-CVD method is more preferably formed adjacent to the substrate. The gas used for deposition is preferably nitrile-based gas, in particular, acetonitrile ($CH_3CN$), since it provides excellent mass productivity. It is sometimes preferable to stack a layer formed by the MT-CVD method described above and a layer formed by a high-temperature CVD (HT-CVD) method, i.e., the conventional CVD method, since the adhesive force between the layers of the coating layer may increase.

The thickness of the inner layer (when the inner layer is formed as two or more layers, the total thickness of the two or more layers) is preferably 0.05 μm or more and 30 μm or less. At a thickness of less than 0.05 μm, the effect of improving various characteristics such as wear resistance is not sufficiently exhibited. Once the thickness exceeds 30 μm, the characteristics do not much improve further and an economical disadvantage occurs thereby. If the economical aspect can be disregarded, the thickness may be set to 30 μm or more and the advantages of the present invention can still be exhibited. The thickness can be measured, for example, by cutting the indexable insert and observing the cross-section with a scanning electron microscope (SEM).

<Outer Layer>

The outer layer of the present invention is formed as one or more layers on the inner layer described above. The outer layer is constituted from an alumina or alumina-containing layer. The thickness of the outer layer is characterized in that, in a portion involved in cutting, $B/A \leq 0.9$ is satisfied, where the average thickness at the flank face side is A μm and the average thickness at the rake face side is B μm. By constituting the outer layer (outermost layer) by the alumina or alumina-containing layer and by decreasing the thickness of the outer layer at the rake face side by a predetermined value or more relative to the thickness of the outer layer at the flank face side in a portion involved in cutting, high wear resistance and high toughness can be simultaneously achieved, in particular, high toughness and high wear resistance at the flank face side can be successfully achieved.

It should be noted here that the crystal structure of alumina (aluminum oxide, $Al_2O_3$) referred herein is not particularly limited. Alumina may be any one or mixture of $\alpha$-$Al_2O_3$, $\kappa$-$Al_2O_3$, $\gamma$-$Al_2O_3$, and amorphous $Al_2O_3$. The phrase "alumina-containing" means that the layer at least partly contains alumina (if 50 mass % or more of alumina is contained, it is regarded as "alumina-containing"). The balance may be a compound that forms the inner layer described above, $ZrO_2$, $Y_2O_3$, or any other suitable substance (this can also be regarded as alumina doped with Zr, Y, or the like). Chlorine, carbon, boron, nitrogen, and other suitable elements may also be contained.

The alumina or alumina-containing layer preferably has compressive stress since the toughness can be effectively enhanced. In such a case, the compressive stress of the rake face is preferably set to be larger than the compressive stress of the flank face to further improve the toughness.

Particularly preferably, the alumina or alumina-containing layer has compressive stress in the portion of the rake face involved in cutting since this most directly contributes to improving the toughness.

The compressive stress introduced in the layer is preferably controlled by first forming an outer layer with a uniform thickness on the inner layer and the blasting, brushing, or barreling the outer layer. As the method for controlling the compressive stress, it is effective to employ a process involving blasting, brushing, barreling, or other suitable processing after formation of the outer layer having a uniform thickness. In conducting blasting, a slurry is preferably applied in a direction substantially perpendicular to the rake face so that the thickness of the outer layer at the rake face side can be effectively decreased and surface roughness can be smoothened. Alternatively, a slurry may be applied in a direction having a particular angle with respect to the rake face so that a plurality of faces can be processed simultaneously. In addition, by conducting these processes, compressive stress is generated in at least one layer of the coating layer, and an advantage of improving the edge strength can be achieved thereby.

"Compressive stress" herein is a type of inner stress (inherent distortion) that exists in this type of coating layer and is indicated as a negative (−) value (unit: GPa is used in the present invention). Thus, the expression that "compressive stress is large" means that the absolute value is large and "compressive stress is small" means that the absolute value is small. In contrast, "tensile stress" is a type of inner stress (inherent distortion) that exists in the coating layer and is a stress indicated as a positive (+) value. When the term "residual stress" is simply used, the term means both the compressive stress and the tensile stress.

The absolute value of the compressive stress is preferably 0.1 GPa or more, more preferably 0.2 GPa or more, and most preferably 0.5 GPa or more. At an absolute value less than 0.1 GPa, sufficient toughness cannot always be obtained. Although the absolute value is preferably as large as possible to impart toughness, separation of the coating layer may occur at an absolute value exceeding 8 GPa, which is not preferred.

The residual stress can be measured by a $\sin^2 \psi$ method using an X-ray stress analyzer. The residual stress can be determined by measuring the stresses at randomly selected ten points in a region in the coating layer to which the compressive stress is applied (preferably, these points are 0.1 mm or more distant from one another so that the each point can represent the stress of the region of the layer) by the $\sin^2 \psi$ method, and calculating the average from the resultant values.

The $\sin^2 \psi$ method using the X-ray is widely used as a method for measuring the residual stress of polycrystalline materials. For example, the method described in detail on pages 54 to 67 of "X-Ray Stress Measurement Method" (The Society of Materials Science, Japan, published by Yokendo Co., Ltd., 1981) may be employed.

Alternatively, the residual stress can be measured by Raman spectroscopy. Raman spectroscopy is advantageous in that local measurement, such as measurement in a narrow range, e.g., at a spot diameter of 1 μm, can be conducted. The measurement of the residual stress by Raman spectroscopy is common. For example, the process described on pages 264 to 271 of "Evaluation Technique for Thin Film Kinetic Properties" (Cipec (company name now is "Realize Advanced Technology Limited"), published in 1992) may be employed.

The residual stress can also be measured using radiant light. The advantage of this method is that the residual stress distribution in the thickness direction of the coating layer can be determined.

The present invention has succeeded in dramatically improving the toughness of the insert as a whole while maintaining the wear resistance at the flank face side by controlling the thickness of the outer layer to be smaller at the rake face side than at the flank face side as described above in the region involved in cutting. In other words, since the wear resistance can be improved by increasing the thickness of the coating layer, a structure is formed such that this effect can be exhibited particularly at the flank face side. Moreover, while the toughness can be improved by decreasing the thickness of the coating layer, a structure is formed such that this effect can be exhibited particularly at the rake face side where high toughness is required. By combining these two structures, improvement of toughness and improvement of wear resistance, which are contradicting properties, can be successfully achieved simultaneously.

Here, the "portion involved in cutting" differs depending on the shape of the indexable insert, the type and size of the workpiece, the type of cutting, etc. It means a region that extends from the edge line that contacts (or comes closest to) the workpiece towards the flank face side and the rake face side by 3 mm each.

The average thickness A μm at the flank face side and the average thickness B μm at the rake face side each mean the average value of the thicknesses measured at ten different points in the above-described region. The thickness can be measured by the same process as those described above. For example, the thickness can be measured by cutting the indexable insert and observing the cross-section with a scanning electron microscope (SEM).

The value of B/A is preferably $B/A \leq 0.7$ and more preferably $B/A \leq 0.5$. If B/A exceeds 0.9, then the effect of achieving wear resistance and toughness simultaneously, in particular, the effect of improving the wear resistance, is not exhibited. Even when B/A is not more than 1, the effect of simultaneously achieving wear resistance and toughness is not exhibited if B/A is more than 0.9. The lower limit of B/A is preferably 0.3 or more. This is because when B/A is less than 0.3, the thickness of the outer layer at the rake surface side is not large enough to prevent degradation of wear resistance at the rake surface side.

The above-described control of the thickness of the outer layer is preferably done by first forming an outer layer with a uniform thickness on the inner layer and then blasting, brushing, or barreling the outer layer. There is another method for controlling the thickness of the outer layer in which the thickness is directly controlled during formation of the outer layer. However, it is difficult to directly form a thin outer layer with a uniform thickness over the entirety of a particular region. Thus, as described above, it is particularly effective to employ a method in which a relatively thick and uniform outer layer is formed first as above and then subjected to blasting or brushing. In conducting blasting, it is preferable to apply a blast in a direction substantially perpendicular to the rake face to effectively decrease the thickness of the outer layer at the rake face side. Alternatively, a blast may be applied in a direction having a particular angle with respect to the rake face so that a plurality of faces can be processed simultaneously.

Figure 10:
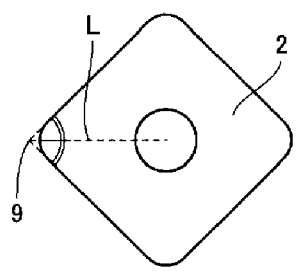
FIG. 10 is a plan view of an indexable insert showing a straight line L bisecting an angle formed by two flank faces.
Figure 11:
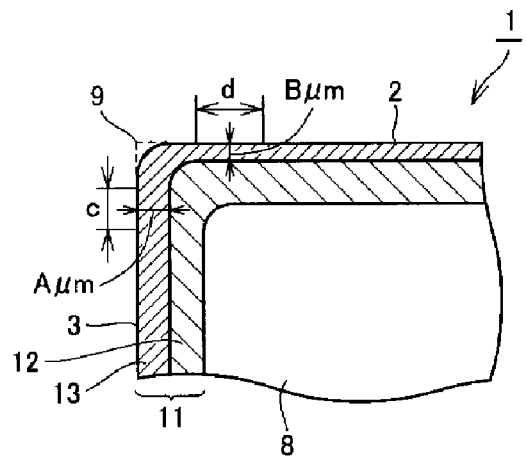
FIG. 11 is a schematic cross-sectional view at the straight line L in FIG. 10.

The outer layer particularly preferably satisfies $B/A \leq 0.9$, where the average thickness of a segment region d 0.5 mm or more and 1 mm or less from a corner 9 toward the flank face 3 side is A μm and the average thickness of a segment region c 0.5 mm or more and 1 mm or less from the corner 9 toward the rake face 2 is B μm, as shown in FIGS. 10 and 11, the average thicknesses being taken on a straight line L that passes through the corner 9 (if edge processing is conducted as shown in the drawings, then the hypothetical corner) involved in cutting, bisects the angle formed on the rake face by two flank faces constituting the corner 9, and extends from the rake face 2 to an intersection line between the two flank faces 3 (although the straight line L is illustrated to lie on the rake face 2 only in FIG. 10, the straight line L also connects to the intersection line (when the edge processing is conducted as shown in the drawings, the intermediate point of radius is assumed to be a hypothetical line)). Under this condition, it is possible to further effectively achieve both wear resistance and toughness, in particular, toughness and the wear resistance at the flank face side.

Here, the "corner involved in cutting" includes a corner that actually contact with (or comes closest to) the workpiece and a corner the edge line in the vicinity of which contacts the workpiece so that the corner is substantially involved in cutting (for example, the cases where the temperature increases). However, a corner that merely comes into contact with scattered cutting chips of the workpiece during cutting is not included.

When the corner and the line are subjected to edge processing, the "intersection line between two flank faces" means a straight line connecting a hypothetical corner to a hypothetical line, which is a straight line passing through the intermediate point of the radius connecting the two flank faces to each other (refer to FIGS. 10 and 11).

The segment regions c and d are defined to be 0.5 mm or more and 1 mm or less as above because it has been assumed that cutting chips of a cut workpiece having a significantly high temperature will contact the regions within the defined range at a high probability and that these regions have the greatest influence on the characteristics such as wear resistance and toughness.

The value of B/A is more preferably $B/A \leq 0.7$ and yet more preferably $B/A \leq 0.5$. If B/A exceeds 0.9, then the effect of achieving wear resistance and toughness simultaneously is not exhibited. When B/A is not more than 1 but more than 0.9, the effect of simultaneously achieving wear resistance and toughness is not exhibited presumably for the same reasons as described above. The lower limit of B/A is preferably 0.3 or more. This is because when B/A is less than 0.3, the thickness of the outer layer at the rake surface side is not large enough to prevent degradation of wear resistance at the rake surface side.

The average thicknesses A μm and B μm respectively refer to the average thicknesses at different ten measurement points in the segment regions c and d. The thickness can be measured by the same method as described above. Moreover, when the indexable insert has a plurality of corners, all corners that can be involved in cutting must satisfy the above-described relationship regarding B/A.

The outer layer can be formed by a commonly known chemical vapor deposition method or a physical vapor deposition method (including a sputtering method). The method for forming the outer layer is not particularly limited.

The outer layer of the present invention serves as the outermost layer of the indexable insert except in portions of the edge line involved in cutting where the outer layer is not formed or only partly formed as described below (that is, the portions where the inner layer is exposed). As discussed above, the outer layer has a function of achieving both wear resistance and toughness. An additional layer may be formed on the outer layer as long as this desirable function is not impaired. Examples of such an additional layer include TiN, TiCN, ZrN, Cr, Al, CrN, AlN, and VN. However, these layers must be removed from the portion involved in cutting, and it is essential that an alumina or alumina-containing layer function as a surface layer in that portion.

The thickness of the outer layer (when the outer layer is formed by stacking two or more layers, the total thickness of such layers) is preferably 0.05 μm or more and 15 μm or less and more preferably 0.1 μm or more and 10 μm or less. At a thickness less than 0.05 μm, it is industrially difficult to form a uniform layer on a designated portion. Once the thickness exceeds 15 μm, the function does not improve much and an economical disadvantage will arise. The thickness can be measured by the same method as described above.

Figure 7:
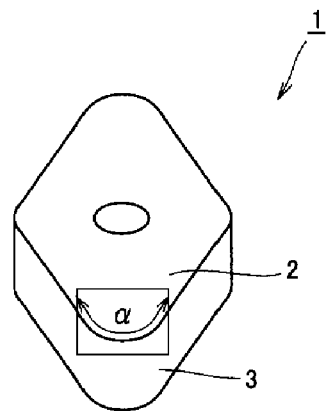
FIG. 7 is a schematic diagram of an indexable insert indicating a cutting edge length.
Figure 8:
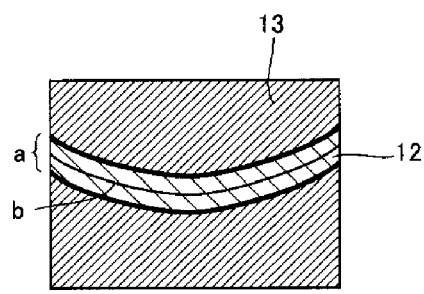
FIG. 8 is a schematic diagram of a scanning electron micrograph enlarging a range α in FIG. 7.
Figure 9:
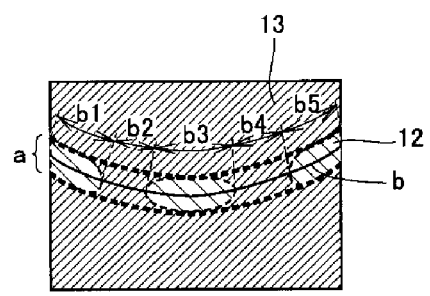
FIG. 9 is another schematic diagram of a scanning electron micrograph enlarging the range α in FIG. 7.

As shown in FIGS. 7 to 9, the outer layer is preferably not formed or only partly formed in the edge line portion involved in cutting. Further excellent welding resistance can be achieved by not providing the outer layer, which is an alumina or alumina-containing layer, in certain portions as such.

Here, the "edge line portion involved in cutting" includes the edge line portion that actually contacts (or comes closest to) the workpiece and the edge line portion the vicinity of which contacts with the workpiece so that this edge line portion is substantially involved in cutting (for example, the cases where the temperature increases). However, the edge line portion that merely comes into contact with scattered cutting chips of the workpiece during cutting is not included.

The "edge line portion" is a region denoted by a in FIGS. 8 and 9. To be more specific, the edge line portion is a region that extends from the edge line (if edge processing described above is conducted, then the hypothetical line) toward the flank face side and the rake face side by 2000 μm or less each side. This region can of course include the corner and can be part of the portion involved in cutting.

The outer layer is deemed as "not formed" unless the outer layer is formed in a region corresponding to 10% or more of the cutting edge length in the edge line portion involved in cutting. When the outer layer is not formed, the above-described excellent effects are exhibited. The region in which the outer layer is not formed is preferably 50% or more and more preferably 100% or more (i.e., the entire region). The effects can be further enhanced as the region becomes larger. Here, the "cutting edge length" refers to the length of the edge line portion involved in cutting, the length being taken in a direction parallel to the edge line.

To be more specific, the decision that the outer layer is not formed is made by observing the indexable insert with a scanning electron microscope so that a photograph that can confirm the state of existing of the outer layer at the edge line portion can be taken. A line parallel to the edge line corresponding to the cutting edge length is drawn on the photograph, and the percentage of the region on the line where the outer layer does not exist is determined.

FIGS. 7 to 9 specifically illustrate the above-described method (schematic diagrams prepared from the SEM micrograph). That is, the range indicated as α in FIG. 7 is the cutting edge length. FIGS. 8 and 9 are enlarged views of the ranges α. FIG. 8 shows the case where the edge line portion involved in cutting is completely free of the outer layer and FIG. 9 shows the case where the outer layer is formed on only part of the edge line portion involved in cutting.

Referring to FIGS. 8 and 9, a line b parallel to the edge line is drawn, and the length of the portion on the line b where the outer layer is not formed is measured. In FIG. 8, there is no outer layer on the line b; thus, the range where no outer layer is formed is 100% (all). In contrast, in FIG. 9, there are portions (b1, b3, and b5) on the line b on which the outer layer is not formed. The ratio of the range where the outer layer is not formed is the percentage obtained by (b1+b3+b5)/(b1+b2+b3+b4+b5). A line that passes through the center of the edge line portion is selected as the line b.

In the ranges where the outer layer is not formed, the inner layer is exposed. The exposed portion of the inner layer may be constituted by the uppermost layer or, alternatively, by the uppermost layer and the layer underneath appearing in a substantially concentric manner.

The regions free of the outer layer can be formed by any of various commonly known processes and the process for forming is not particularly limited. For example, the outer layer is first formed on the inner layer and then certain regions of the outer layer to be removed are subjected to blasting, brushing, or barreling to remove the outer layer. However, any other suitable method may be employed without limitation.

EXAMPLES

The present invention will now be described in further detail by way of non-limiting examples.

Example 1

A cemented carbide powder containing 1.7 percent by mass of TiC, 1.0 percent by mass of TaC, 1.1 percent by mass of NbC, 6.0 percent by mass of Co, and the balance being WC was pressed, sintered in a vacuum atmosphere at 1430° C. for 1 hour, and subjected to smooth polishing and edge-processing of an edge line with a SiC brush (horning of a width of 0.05 mm from the rake face side) to prepare, as a substrate, a cemented carbide tip having the same shape as a cutting tip CNMA120408 (JIS B 4120:1998). The substrate had no β-free layer but had two rake faces and four flank faces, each rake face and each flank face being connected with an edge line (since the edge processing was conducted as described above, the edge line was a hypothetical line) therebetween. The substrate had a total of eight edge lines. A point of intersection of two flank faces and one rake face was a corner (since the edge processing was conducted as described above, the point of intersection was a hypothetical point). The substrate had a total of eight corners (however, because of the shape of the tip used here, corners with an apex angle of 80° when viewed from the bottom or top face are frequently used for cutting, and in such cases, the number of the corners can be considered to be four).

On the entire surface of the substrate, the following layers were sequentially formed as a coating layer by a commonly known thermal CVD method starting from the bottom layer. That is, in the order from the substrate surface side, 0.3 μm TiN, 6.5 μm TiCN (formed by MT-CVD), 1.1 μm TiCN (formed by HT-CVD), and 0.3 μm TiBN (TiB$_X$N$_Y$:X/(X+Y)= 0.019) were formed to constitute the inner layer, a 3.7 μm α alumina (α-Al$_2$O$_3$) layer was formed as the outer layer on the TiBN layer, which was the uppermost layer of the inner layer, and 0.6 µm TiN was formed on the outer layer (the resulting coating layer is referred to as "coating layer No. 1").

Each of coating layers Nos. 2 to 7 shown in Table I was formed as in above instead of coating layer No. 1 over the entire surface of a substrate.

TABLE I

| | Coating layer | |
|---|---|---|
| No. | Inner layer | Outer layer |
| 1 | TiN(0.3 µm)/TiCN(MT-CVD, 6.5 µm)/TiCN(HT-CVD, 1.1 µm)/TiBN(0.3 µm) | α-Al$_2$O$_3$(3.7 µm)/TiN(0.6 µm) |
| 2 | TiC(1.0 µm)/TiCN(MT-CVD, 5.2 µm)/TiN(0.3 µm) | κ-Al$_2$O$_3$(2.1 µm) |
| 3 | TiN(0.3 µm)/TiCN(MT-CVD, 2.8 µm)/TiC(1.2 µm)/TiBN(0.2 µm) | κ-Al$_2$O$_3$(1.8 µm) |
| 4 | TiN(0.4 µm)/TiCN(3.7 µm)/TiCNO(0.4 µm) | α-Al$_2$O$_3$(2.8 µm) |
| 5 | TiN(0.3 µm)/TiCN(MT-CVD, 3.7 µm)/TiBN(0.6 µm) | α-Al$_2$O$_3$(2.4 µm) |
| 6 | TiN(0.4 µm)/TiCN(MT-CVD, 7.3 µm)/TiCBN(0.7 µm) | α-Al$_2$O$_3$(7.9 µm) |
| 7 | TiN(0.5 µm)/TiCN(MT-CVD, 4.1 µm)/TiBNO(0.4 µm) | α-Al$_2$O$_3$(2.5 µm) |

Note:
TiBN in No. 3 was TiB$_X$N$_Y$ (X/(X + Y) = 0.029).
TiCNO in No. 4 was TiC$_X$N$_Y$O$_Z$ (X/(X + Y + Z) = 0.69, Z/(X + Y + Z) = 0.08).
α-Al$_2$O$_3$ in No. 4 contained 0.18 percent by mass of Zr (EPMA (Electron Probe Microanalysis) analytical result).
TiBN in No. 5 was TiB$_X$N$_Y$ (X/(X + Y) = 0.011).
TiCBN in No. 6 was TiC$_X$B$_Y$N$_Z$ (Y/(X + Y + Z) = 0.012, X/(X + Y + Z) = 0.44).
TiBNO in No. 7 was TiB$_X$N$_Y$O$_Z$ (X/(X + Y + Z) = 0.031, Z/(X + Y + Z) = 0.20)

The layers of the inner layer shown in Table I were stacked on the surface of the substrate in the order from the left. Each of the layers were formed by a commonly known thermal CVD (the layers noted as "MT-CVD" are formed by MT-CVD (deposition temperature: 900° C.) and the layers noted as "HT-CVD" are formed by HT-CVD (deposition temperature: 1000° C.)).

The substrates with these coating layers thereon were each subjected to blasting (abrasive particles: alumina sand No. 120 (average particle diameter: 100 µm), pressure: 0.3 MPa), brushing (with a diamond brush), or barreling commonly known in the art to perform the following eight types of processes A to H.

(Process A)
The coating layer was not subjected to blasting or brushing.
(Process B)
The coating layer was subjected to brushing so that the average thickness of the outer layer was as indicated in Tables II and III.
(Process C)
The coating layer was subjected to blasting so that the average thickness of the outer layer was as indicated in Tables II and III.
(Process D)
The coating layer was subjected to brushing so that the average thickness of the outer layer was as indicated in Tables II and III, and then to blasting.
(Process E)
The coating layer was subjected to blasting so that the average thickness of the outer layer was as indicated in Tables II and III, and then to brushing.
(Process F)
The coating layer was subjected to brushing so that the average thickness of the outer layer was as indicated in Tables II and III, and then to barreling.
(Process G)
The coating layer was subjected to blasting so that the average thickness of the outer layer was as indicated in Tables II and III, and then to barreling.
(Process H)
The coating layer was subjected to barreling so that the average thickness of the outer layer was as indicated in Tables II and III, and then to blasting.

The thickness of the outer layer in Tables II and III was determined as follows. On a straight line that passed through the corner involved in cutting as shown in FIG. 11 (that is, the corner to which the following cutting test was subjected), bisected the angle formed on the rake face by the two flank faces constituting the corner, and extended from the rake face to an intersection line between the two flank faces, the average thickness of a segment region c 0.5 mm or more and 1 mm or less from the corner toward the flank face side was determined as A µm and the average thickness of a segment region d 0.5 mm or more and 1 mm or less from the corner toward the rake face was determined as B µm. The value B/A was then calculated.

In the indexable inserts with coating layer No. 1 formed thereon, the TiN layer on the outer layer was completely removed from the region extending from the edge line to the segment regions c and d except for inserts Nos. 1 and 14. In inserts Nos. 1 and 14, the TiN layer was left intact on the surface of the region extending from the edge line to the segment regions c and d. Their thicknesses indicated in the tables are the thickness of the TiN layer alone.

In Tables II and III, "removal ratio" indicates the percentage of the portion free of the outer layer in the edge line portion involved in cutting (the cutting edge length was set to 50 µm, and the line b was drawn at the center of the region a as shown in FIG. 9) calculated according to the aforementioned method. This region where the outer layer was not formed was formed by removing the outer layer in that portion by the process described above.

Thirty-two types of indexable inserts Nos. 1 to 32 indicated in Tables II and III were produced as such. The asterisked samples in the tables are examples of the present invention and other samples are comparative examples.

A turning test was conducted on each of indexable inserts Nos. 1 to 32 under the conditions below so as to measure the amount of flank wear and fracture ratio of each indexable insert (the amount of flank wear was determined by wear resistance test and the fracture ratio was determined by toughness test). Moreover, in the wear resistance test, the state of welding of the workpiece on the edge and the state of the work surface of the workpiece after 1 min of cutting were observed. The results are indicated in Tables II and III. The smaller the amount of flank wear, the higher the wear resistance. The smaller the fracture ratio, the higher the toughness. The larger the amount of welding of the workpiece on the edge, the poorer the surface roughness of the workpiece. The closer the state of the work surface of the workpiece to the mirror surface, the better the state of the work surface.

<Conditions of Turning Test>
(Wear Resistance Test)
    Workpiece: FC 250 round bar
    Cutting speed: 360 m/min
    Feed: 0.25 mm/rev
    Depth of cut: 2.0 mm
    Lubricant: None
    Cutting time: 15 min
(Toughness Test)
    Workpiece: FC 200 square bar
    Cutting speed: 130 m/min
    Feed: 0.45 mm/rev
    Depth of cut: 2.0 mm
    Lubricant: None
    Cutting time: 5 min Rating: Fracture ratio was determined from the number of cutting edge fractures out of 20 cutting edges after 5 minutes of cutting.

with chip breakers, the same effects are confirmed with indexable inserts without chip breakers as described in the examples below.

TABLE II

| Inserts Nos. | Coating Layer No. | Process | Outer layer A μm | B μm | B/A | Removal ratio (%) | Amount of flank wear (mm) | Fracture ratio (%) | State of welding of workpiece on edge | State of work surface of workpiece |
|---|---|---|---|---|---|---|---|---|---|---|
| 1 | 1 | A | 0.6 (TiN) | 0.6 (TiN) | 1.00 | 0 | 0.199 | 100 | Extensive welding | Clouded |
| 2 | 2 | A | 2.1 | 2.1 | 1.00 | 0 | 0.218 | 80 | None | Near mirror |
| 3 | 3 | A | 1.8 | 1.8 | 1.00 | 0 | 0.214 | 85 | None | Near mirror |
| 4 | 4 | A | 2.8 | 2.8 | 1.00 | 0 | 0.200 | 90 | None | Near mirror |
| 5 | 5 | A | 2.4 | 2.4 | 1.00 | 0 | 0.213 | 80 | None | Near mirror |
| 6 | 6 | A | 7.9 | 7.9 | 1.00 | 0 | 0.173 | 95 | None | Near mirror |
| 7 | 7 | A | 2.5 | 2.5 | 1.00 | 0 | 0.210 | 80 | None | Near mirror |
| 8 | 1 | B | 3.4 | 3.3 | 0.97 | 0 | 0.198 | 90 | None | Near mirror |
| * 9 | 1 | E | 3.3 | 2.8 | 0.84 | 0 | 0.195 | 55 | None | Near mirror |
| * 10 | 1 | E | 3.3 | 1.8 | 0.55 | 0 | 0.196 | 50 | None | Near mirror |
| * 11 | 1 | D | 3.3 | 2.4 | 0.73 | 0 | 0.195 | 55 | None | Near mirror |
| * 12 | 1 | D | 3.2 | 1.6 | 0.50 | 0 | 0.195 | 45 | None | Near mirror |
| * 13 | 1 | C | 3.0 | 1.0 | 0.33 | 0 | 0.196 | 40 | None | Near mirror |
| 14 | 1 | C | 0.5 (TiN) | 0.3 (TiN) | 0.60 | 0 | 0.196 | 95 | Moderate welding | Slightly clouded |
| * 15 | 2 | B | 2.0 | 1.7 | 0.85 | 0 | 0.213 | 45 | None | Near mirror |
| * 16 | 2 | C | 2.0 | 1.3 | 0.65 | 0 | 0.214 | 40 | None | Near mirror |

TABLE III

| Insert Nos. | Coating layer No. | Process | Outer layer A μm | B μm | B/A | Removal ratio (%) | Amount of flank wear (mm) | Fracture ratio (%) | State of welding of workpiece on edge | State of work surface of workpiece |
|---|---|---|---|---|---|---|---|---|---|---|
| * 17 | 3 | B | 1.6 | 0.8 | 0.50 | 0 | 0.207 | 35 | None | Near mirror |
| * 18 | 3 | C | 1.6 | 1.0 | 0.63 | 0 | 0.208 | 40 | None | Near mirror |
| 19 | 4 | B | 2.5 | 1.7 | 0.68 | 0 | 0.196 | 40 | None | Near mirror |
| 20 | 4 | C | 2.5 | 2.0 | 0.80 | 0 | 0.195 | 40 | None | Near mirror |
| * 21 | 5 | B | 2.1 | 1.6 | 0.76 | 0 | 0.208 | 40 | None | Near mirror |
| * 22 | 5 | C | 2.1 | 1.2 | 0.57 | 0 | 0.207 | 35 | None | Near mirror |
| 23 | 6 | B | 7.5 | 6.1 | 0.81 | 0 | 0.169 | 40 | None | Near mirror |
| 24 | 6 | C | 7.4 | 5.8 | 0.78 | 0 | 0.168 | 40 | None | Near mirror |
| * 25 | 7 | B | 2.2 | 1.5 | 0.68 | 0 | 0.205 | 40 | None | Near mirror |
| * 26 | 7 | C | 2.0 | 1.0 | 0.50 | 0 | 0.205 | 35 | None | Near mirror |
| * 27 | 5 | D | 2.1 | 1.6 | 0.76 | 12 | 0.184 | 35 | None | Near mirror |
| * 28 | 5 | F | 2.1 | 1.6 | 0.76 | 24 | 0.173 | 30 | None | Near mirror |
| * 29 | 5 | G | 2.1 | 1.2 | 0.57 | 38 | 0.164 | 25 | None | Near mirror |
| * 30 | 5 | E | 2.1 | 1.0 | 0.48 | 57 | 0.153 | 20 | None | Near mirror |
| * 31 | 5 | E | 2.0 | 1.1 | 0.55 | 79 | 0.147 | 10 | None | Near mirror |
| * 32 | 5 | G | 2.0 | 1.1 | 0.55 | 100 | 0.142 | 5 | None | Near mirror |

Tables II and III clearly show that the indexable inserts of the examples of the present invention having B/A calculated from the average thicknesses A μm and B μm of the outer layer of 0.9 or less are superior to those of the indexable inserts of the comparative examples in terms of the amount of flank wear and the fracture ratio, indicating that they achieve high wear resistance and high toughness simultaneously. The indexable inserts having a TiN layer instead of an alumina layer as the surface had a workpiece welded on the cutting edge and the workpiece after processing was clouded.

It is evident from above that the indexable inserts of the examples of the present invention exhibit effects superior to those of the indexable inserts of the comparative examples. Both high wear resistance (particularly at the flank face side) and the toughness could be achieved simultaneously. Although the examples used here concern indexable inserts with chip breakers, the same effects are confirmed with indexable inserts without chip breakers as described in the examples below.

Example 2

A cemented carbide powder containing 0.8 percent by mass of TaC, 5.0 percent by mass of Co, and the balance being WC was pressed, sintered in a vacuum atmosphere at 1450° C. for 1 hour, and subjected to smooth polishing and edge-processing of an edge line with a SiC brush (horning of a width of 0.05 mm from the rake face side) to prepare, as a substrate, a cemented carbide tip having the same shape as a cutting tip CNMN120408N-UX (manufactured by Sumitomo Electric Hardmetal Corporation). The substrate had no chip breaker but a 15 μm β-free layer on the surface. The substrate had two rake faces and four flank faces, each rake face and each flank face being connected with an edge line (since the edge processing was conducted as described above, the edge line was a hypothetical line) therebetween. The substrate had a total of eight edge lines. A point of intersection of two flank faces and one rake face was a corner (since the edge processing was conducted as described above, the point of intersection was a hypothetical point). The substrate had a total of eight corners (however, because of the shape of the tip used here, corners with an apex angle of 80° when viewed from the bottom or top face are frequently used for cutting, and in such cases, the number of the corners can be considered to be four).

Next, as described in Table IV, the same coating layers as in EXAMPLE 1 were formed over the entire surfaces of the substrates (the coating layer Nos. in Table IV are the same as those in EXAMPLE 1).

Each of the substrates with the coating layers thereon was subjected to the process as in EXAMPLE 1. The thickness of the outer layer, B/A, and the removal ratio in Table IV were determined as in EXAMPLE 1. In the indexable inserts with coating layer No. 1 formed thereon, the TiN layer on the outer layer was completely removed from the region extending from the edge line to the segment regions c and d except for insert No. 33. In insert No. 33, the TiN layer on the surface was left intact on the surface of the region extending from the edge line to the segment regions c and d. The thickness indicated is the thickness of the TiN layer alone.

Twenty types of indexable inserts Nos. 33 to 52 indicated in Table IV were produced as such. The asterisked samples in the tables are examples of the present invention, and other samples are comparative examples.

A turning test was conducted on each of indexable inserts Nos. 33 to 52 under the conditions below so as to measure the amount of flank wear and fracture ratio of each indexable insert. Moreover, in the wear resistance test, the state of welding of the workpiece on the edge and the state of the work surface of the workpiece after 10 minutes of cutting were observed.

<Conditions of Turning Test>
(Wear Resistance Test)
 Workpiece: Inconel 718
 Cutting speed: 40 m/min
 Feed: 0.3 mm/rev
 Depth of cut: 1.0 mm
 Lubricant: Yes
 Cutting time: 5 min
(Toughness Test)
 Workpiece: FC 250 square bar
 Cutting speed: 140 m/min
 Feed: 0.5 mm/rev
 Depth of cut: 2.0 mm
 Lubricant: None
 Cutting time: 5 min
 Rating: Fracture ratio was determined from the number of cutting edge fractures out of 20 cutting edges after 5 minutes of cutting.

TABLE IV

| | Inserts Nos. | Coating Layer No. | Process | Outer layer A μm | Outer layer B μm | B/A | Removal ratio (%) | Amount of flank wear (mm) | Fracture ratio (%) | State of welding of workpiece on edge | State of work surface of workpiece |
|---|---|---|---|---|---|---|---|---|---|---|---|
|   | 33 | 1 | A | 0.6 (TiN) | 0.6 (TiN) | 1.00 | 0 | 0.248 | 100 | Extensive welding | Clouded |
|   | 34 | 2 | A | 2.1 | 2.1 | 1.00 | 0 | 0.298 | 90 | Extensive welding | Clouded |
|   | 35 | 4 | A | 2.8 | 2.8 | 1.00 | 0 | 0.235 | 90 | Extensive welding | Clouded |
|   | 36 | 5 | A | 2.4 | 2.4 | 1.00 | 0 | 0.251 | 95 | Extensive welding | Clouded |
|   | 37 | 7 | A | 2.5 | 2.5 | 1.00 | 0 | 0.276 | 90 | Extensive welding | Clouded |
| * | 38 | 1 | C | 3.2 | 1.6 | 0.50 | 0 | 0.237 | 65 | Extensive welding | Clouded |
|   | 39 | 1 | B | 3.2 | 3.2 | 1.00 | 0 | 0.247 | 95 | None | Glossy |
| * | 40 | 2 | C | 2.0 | 1.7 | 0.85 | 0 | 0.297 | 60 | None | Glossy |
| * | 41 | 2 | B | 1.8 | 1.2 | 0.67 | 0 | 0.286 | 55 | None | Glossy |
| * | 42 | 2 | C | 1.6 | 0.4 | 0.25 | 0 | 0.279 | 50 | None | Glossy |
|   | 43 | 4 | B | 2.6 | 2.0 | 0.77 | 0 | 0.227 | 55 | None | Glossy |
|   | 44 | 4 | C | 2.5 | 1.1 | 0.44 | 0 | 0.222 | 50 | None | High glossy |
| * | 45 | 5 | B | 2.0 | 1.4 | 0.70 | 0 | 0.245 | 50 | None | Glossy |
| * | 46 | 5 | C | 1.9 | 0.8 | 0.42 | 0 | 0.241 | 45 | None | Glossy |
| * | 47 | 7 | C | 2.4 | 2.1 | 0.88 | 11 | 0.270 | 50 | None | Glossy |
| * | 48 | 7 | F | 2.3 | 1.8 | 0.78 | 28 | 0.248 | 45 | None | High glossy |
| * | 49 | 7 | G | 2.4 | 2.1 | 0.88 | 40 | 0.236 | 40 | None | Glossy |
| * | 50 | 7 | G | 2.4 | 2.1 | 0.88 | 61 | 0.229 | 35 | None | Glossy |
| * | 51 | 7 | G | 2.4 | 2.1 | 0.88 | 80 | 0.218 | 30 | None | High glossy |
| * | 52 | 7 | G | 2.4 | 2.1 | 0.88 | 100 | 0.208 | 25 | None | Glossy |

Table IV clearly shows that the indexable inserts of the examples of the present invention having B/A calculated from the average thicknesses A μm and B μm of the outer layer of 0.9 or less are superior to those of the indexable inserts of the comparative examples in terms of the amount of flank wear and the fracture ratio, indicating that they achieve high wear resistance and high toughness simultaneously. The indexable inserts having a TiN layer instead of an alumina layer as the surface had a workpiece welded on the cutting edge and the workpiece after processing was clouded.

It is evident from above that the indexable inserts of the examples of the present invention exhibit effects superior to those of the indexable inserts of the comparative examples. Both high wear resistance (particularly at the flank face side) and high toughness could be achieved simultaneously.

Example 3

A cemented carbide powder containing 1.3 percent by mass of TaC, 10.5 percent by mass of Co, and the balance being WC was pressed, sintered in a vacuum atmosphere at 1400° C. for 1 hour, and subjected to smooth polishing and edge-processing of an edge line with a SiC brush (horning of a width of 0.05 mm from the rake face side) to prepare, as a substrate, a cemented carbide tip having the same shape as a cutting tip SEMT13T3AGSN-G (manufactured by Sumitomo Electric Hardmetal Corporation). The substrate had no β-free layer on the surface. The substrate had one rake face and four flank faces. Each flank face and the rake face are connected to each other with an edge line (since the edge processing was conducted as described above, the edge line was a hypothetical line) therebetween. The substrate had a total of four edge lines. A point of intersection of two flank faces and one rake face was a corner (since the edge processing was conducted as described above, the point of intersection was a hypothetical point). The substrate had a total of four corners.

On the entire surface of the substrate, the following layers were sequentially formed as a coating layer by a commonly known thermal CVD method starting from the bottom layer. That is, in the order from the substrate surface side, 0.4 μm TiN, 2.3 μm TiCN (formed by MT-CVD), and 0.4 μm TiBN (TiB$_X$N$_Y$:X/(X+Y)=0.030) were formed to constitute the inner layer; a 2.2 μm α-alumina (α-Al$_2$O$_3$) layer was formed as the outer layer on the TiBN layer, which was the uppermost layer of the inner layer; and 0.7 μm TiN was formed on the outer layer (the resulting coating layer is referred to as "coating layer No. 8").

Each of coating layers Nos. 9 to 13 shown in Table V was formed as in above instead of coating layer No. 8 over the entire surface of a substrate.

TABLE V

| | Coating layer | |
|---|---|---|
| No. | Inner layer | Outer layer |
| 8 | TiN(0.4 μm)/TiCN(MT-CVD, 2.3 μm)/TiBN(0.4 μm) | α-Al$_2$O$_3$(2.2 μm)/TiN(0.7 μm) |
| 9 | TiN(0.3 μm)/TiCN(MT-CVD, 3.2 μm)/TiCN(HT-CVD, 0.8 μm)/TiBN(0.3 μm) | κ-Al$_2$O$_3$(1.9 μm) |
| 10 | TiN(0.3 μm)/TiCN(MT-CVD, 2.8 μm)/TiBNO(0.7 μm) | α-Al$_2$O$_3$(2.2 μm) |
| 11 | TiN(0.8 μm)/TiCN(MT-CVD, 4.6 μm)/TiBN(0.5 μm) | α-Al$_2$O$_3$(2.2 μm) |
| 12 | TiAlN(2.2 μm)/TiN(0.5 μm) | α-Al$_2$O$_3$(1.8 μm) |
| 13 | CrAlN(3.0 μm)/TiN(0.2 μm) | κ-Al$_2$O$_3$(1.2 μm) |

Note:
TiBN in No. 9 was TiB$_X$N$_Y$ (X/(X + Y) = 0.009)
TiBNO in No. 10 was TiB$_X$N$_Y$O$_Z$ (X/(X + Y + Z) = 0.013, Z/(X + Y + Z) = 0.22)
TiBN in No. 11 was TiB$_X$N$_Y$ (X/(X + Y) = 0.032).
α-Al$_2$O$_3$ in No. 11 contained 2.2 percent by mass of Zr (EPMA (Electron Probe Microanalysis) analytical result).

The layers of the inner layer shown in Table V were stacked on the surface of the substrate in the order from the left. Coating layers Nos. 8 to 11 were formed by a commonly known thermal CVD method as with coating layer No. 7. Coating layers Nos. 12 and 13 were formed by a commonly known PVD method.

The substrates with these coating layers thereon were subjected to the same processes as in EXAMPLE 1.

Twenty-five types of indexable inserts Nos. 53 to 77 shown in Tables VI and VII were produced as such. The asterisked samples in the tables are examples of the present invention, and other samples are comparative examples. The thickness of the outer layer, B/A, and the removal ratio in Tables VI and VII were determined as in EXAMPLE 1. In the indexable inserts with coating layer No. 8 formed thereon, the TiN layer on the outer layer was completely removed from the region extending from the edge line to the segment regions c and d except for inserts No. 53 and No. 59. In inserts Nos. 53 and 59, the TiN layer was left intact the region extending from the edge line to the segment regions c and d. Their thicknesses indicated are the thickness of the TiN layer alone.

A turning test was conducted on each of indexable inserts Nos. 53 to 77 under the conditions below so as to measure the amount of flank wear and fracture ratio. Moreover, in the wear resistance test, the state of welding of the workpiece on the edge and the state of the work surface of the workpiece after 10 m of cutting were observed. The results are indicated in Tables VI and VII below.

<Conditions of Turning Test>
(Wear Resistance Test)
 Workpiece: FC 250
 Cutting speed: 400 m/min
 Feed: 0.25 mm/edge
 Depth of cut: 2.0 mm
 Lubricant: Yes
 Cutting distance: 10 m
 Cutter: WGC4100R (manufactured by Sumitomo Electric Hardmetal Corporation)
 One indexable insert was mounted on the cutter.
(Toughness Test)
 Workpiece: SCM440 (triple)
 Cutting speed: 200 m/min
 Feed: 0.45 mm/edge
 Depth of cut: 2.0 mm
 Lubricant: None
 Cutting distance: 0.5 m
 Cutter: WGC4100R (manufactured by Sumitomo Electric Hardmetal Corporation)
 One indexable insert was mounted on the cutter.
 Rating: Fracture ratio was determined from the number of cutting edge fractures out of 20 cutting edges after 0.5 m of cutting.

TABLE VI

| Inserts Nos. | Coating Layer No. | Process | Outer layer A μm | Outer layer B μm | B/A | Removal ratio (%) | Amount of flank wear (mm) | Fracture ratio (%) | State of welding of workpiece on edge | State of work surface of workpiece |
|---|---|---|---|---|---|---|---|---|---|---|
| 53 | 8 | A | 0.7 (TiN) | 0.7 (TiN) | 1.00 | 0 | 0.224 | 100 | Extensive welding | Clouded |
| 54 | 9 | A | 1.9 | 1.9 | 1.00 | 0 | 0.231 | 90 | Extensive welding | Clouded |

TABLE VI-continued

| Inserts Nos. | Coating Layer No. | Process | Outer layer A μm | Outer layer B μm | B/A | Removal ratio (%) | Amount of flank wear (mm) | Fracture ratio (%) | State of welding of workpiece on edge | State of work surface of workpiece |
|---|---|---|---|---|---|---|---|---|---|---|
| 55 | 10 | A | 2.2 | 2.2 | 1.00 | 0 | 0.218 | 90 | Extensive welding | Clouded |
| 56 | 11 | A | 2.2 | 2.2 | 1.00 | 0 | 0.204 | 95 | Extensive welding | Clouded |
| 57 | 12 | A | 1.8 | 1.8 | 1.00 | 0 | 0.253 | 80 | Extensive welding | Clouded |
| 58 | 13 | A | 1.2 | 1.2 | 1.00 | 0 | 0.276 | 75 | Extensive welding | Clouded |
| 59 | 8 | C | 0.6 (TiN) | 0.3 (TiN) | 0.50 | 0 | 0.223 | 95 | Extensive welding | Clouded |
| 60 | 8 | C | 2.0 | 1.9 | 0.95 | 0 | 0.221 | 85 | None | Glossy |
| *61 | 8 | C | 1.8 | 1.4 | 0.78 | 0 | 0.198 | 65 | None | Glossy |
| *62 | 8 | C | 1.7 | 0.9 | 0.53 | 0 | 0.187 | 60 | None | Glossy |
| *63 | 9 | C | 1.8 | 0.9 | 0.50 | 0 | 0.195 | 60 | None | Glossy |
| *64 | 10 | C | 2.0 | 1.6 | 0.80 | 0 | 0.191 | 60 | None | Glossy |
| *65 | 11 | C | 0.9 | 0.5 | 0.56 | 0 | 0.184 | 60 | None | Glossy |

TABLE VII

| Inserts Nos. | Coating Layer No. | Process | Outer layer A μm | Outer layer B μm | B/A | Removal ratio (%) | Amount of flank wear (mm) | Fracture ratio (%) | State of welding of workpiece on edge | State of work surface of workpiece |
|---|---|---|---|---|---|---|---|---|---|---|
| 66 | 12 | C | 1.7 | 1.0 | 0.59 | 0 | 0.224 | 45 | None | Glossy |
| 67 | 13 | C | 1.0 | 0.6 | 0.60 | 0 | 0.228 | 45 | None | Glossy |
| *68 | 8 | E | 1.8 | 1.4 | 0.78 | 22 | 0.185 | 55 | None | Near mirror |
| *69 | 8 | G | 1.8 | 1.4 | 0.78 | 42 | 0.187 | 50 | None | Near mirror |
| *70 | 8 | E | 1.8 | 1.4 | 0.78 | 61 | 0.175 | 30 | None | Near mirror |
| *71 | 8 | D | 1.8 | 1.4 | 0.78 | 81 | 0.168 | 20 | None | Near mirror |
| *72 | 8 | E | 1.8 | 1.4 | 0.78 | 100 | 0.161 | 5 | None | Near mirror |
| *73 | 9 | E | 1.8 | 0.9 | 0.50 | 55 | 0.185 | 40 | None | Near mirror |
| *74 | 10 | D | 2.0 | 1.6 | 0.80 | 51 | 0.182 | 35 | None | Near mirror |
| *75 | 11 | E | 0.9 | 0.5 | 0.56 | 72 | 0.173 | 35 | None | Near mirror |
| 76 | 12 | H | 1.7 | 1.0 | 0.59 | 62 | 0.210 | 15 | None | Near mirror |
| 77 | 13 | D | 1.0 | 0.6 | 0.60 | 80 | 0.212 | 15 | None | Near mirror |

Table VI and VII clearly show that the indexable inserts of the examples of the present invention having B/A calculated from the average thicknesses A μm and B μm of the outer layer of 0.9 or less are superior to those of the indexable inserts of the comparative examples in terms of the amount of flank wear and the fracture ratio, indicating that they achieve high wear resistance and high toughness simultaneously. The indexable inserts having a TiN layer instead of an alumina layer as the surface had a workpiece welded on the cutting edge and the workpiece after processing was clouded.

It is evident from above that the indexable inserts of the examples of the present invention exhibit effects superior to those of the indexable inserts of the comparative examples. Both high wear resistance (particularly at the flank face side) and the toughness could be achieved simultaneously. Although the examples used here concern indexable inserts with chip breakers, the same effects are confirmed with indexable inserts without chip breakers as described in the examples below.

Example 4

Figure 12:
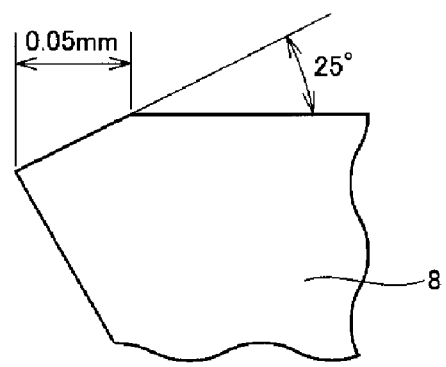
FIG. 12 is a schematic cross-sectional view showing one example of an edge-processed portion of a substrate.

A cemented carbide powder containing 0.6 percent by mass of TaC, 0.3 percent by mass of $Cr_3C_2$, 8.2 percent by mass of Co, and the balance being WC was pressed, sintered in a vacuum atmosphere at 1450° C. for 1 hour, and subjected to smooth polishing and edge-processing of an edge line with a SiC brush (horning of a width of 0.05 mm at an angle of 25° from the rake face side, refer to FIG. 12) to prepare, as a substrate, a cemented carbide tip having the same shape as a cutting tip SPGN120408 in accordance with JIS B4120 (revised in 1998). The substrate had no chip breaker, and no β-free layer was formed on the surface. The substrate had one rake face and four flank faces, the rake face and each flank face being connected with an edge line (since the edge processing was conducted as described above, the edge line was a hypothetical line) therebetween. The substrate had a total of four edge lines. A point of intersection of two flank faces and one rake face was a corner (since the edge processing was conducted as described above, the point of intersection was a hypothetical point). The substrate had a total of four corners.

Next, as described in Table VIII below, the same coating layers as in EXAMPLE 3 were formed on the entire surfaces of substrates (coating layer Nos. in Table VIII are the same as those in EXAMPLE 3).

Each of the substrates with the coating layers thereon was subjected to the process as in EXAMPLE 1. The thickness of the outer layer, B/A, and the removal ratio in Table VIII were determined as in EXAMPLE 1. In the indexable inserts with the coating layer No. 8 formed thereon, the TiN layer on the outer layer was completely removed from the region extending from the edge line to the segment regions c and d except for inserts Nos. 78 and 84. In inserts Nos. 78 and 84, the TiN layer on the surface was left intact in the region extending from the edge line to the segment regions c and d. Their thicknesses indicated in the tables are the thickness of the TiN layer alone.

Twenty-two types of indexable inserts Nos. 78 to 99 indicated in Table VIII were produced as such. The asterisked samples in the tables are examples of the present invention, and other samples are comparative examples.

A turning test was conducted on each of indexable inserts Nos. 78 to 99 under the conditions below so as to measure the amount of flank wear and fracture ratio of each indexable insert. Moreover, in the wear resistance test, the state of welding of the workpiece on the edge and the state of the work surface of the workpiece after 10 m of cutting were observed. The results are shown in Table VIII below.
<Conditions of Turning Test>
(Wear Resistance Test)
  Workpiece: FC200
  Cutting speed: 380 m/min
  Feed: 0.3 mm/edge
  Depth of cut: 2.0 mm
  Lubricant: Yes
  Cutting distance: 10 m
  Cutter: WGC4100R (manufactured by Sumitomo Electric Hardmetal Corporation)
  One indexable insert was mounted on the cutter.
(Toughness Test)
  Workpiece: FC250 (triple)
  Cutting speed: 250 m/min
  Feed: 0.55 mm/edge
  Depth of cut: 2.0 mm
  Lubricant: None
  Cutting distance: 0.5 m
  Cutter: DPG4100R (manufactured by Sumitomo Electric Hardmetal Corporation)
  One indexable insert was mounted on the cutter.
  Rating: Fracture ratio was determined from the number of cutting edge fractures out of 20 cutting edges after 0.5 m of cutting.

TABLE VIII

| | Inserts Nos. | Coating Layer No. | Process | Outer layer A μm | Outer layer B μm | B/A | Removal ratio (%) | Amount of flank wear (mm) | Fracture ratio (%) | State of welding of workpiece on edge | State of work surface of workpiece |
|---|---|---|---|---|---|---|---|---|---|---|---|
| | 78 | 8 | A | 0.7 (TiN) | 0.7 (TiN) | 1.00 | 0 | 0.244 | 100 | Extensive welding | Clouded |
| | 79 | 9 | A | 1.9 | 1.9 | 1.00 | 0 | 0.250 | 95 | Extensive welding | Clouded |
| | 80 | 10 | A | 2.2 | 2.2 | 1.00 | 0 | 0.229 | 95 | Extensive welding | Clouded |
| | 81 | 11 | A | 2.2 | 2.2 | 1.00 | 0 | 0.221 | 95 | Extensive welding | Clouded |
| | 82 | 12 | A | 1.8 | 1.8 | 1.00 | 0 | 0.265 | 85 | Extensive welding | Clouded |
| | 83 | 13 | A | 1.2 | 1.2 | 1.00 | 0 | 0.289 | 80 | Extensive welding | Clouded |
| | 84 | 8 | C | 0.6 (TiN) | 0.2 (TiN) | 0.33 | 0 | 0.241 | 100 | Extensive welding | Clouded |
| | 85 | 8 | C | 2.0 | 1.9 | 0.95 | 0 | 0.238 | 90 | None | Glossy |
| * | 86 | 8 | C | 1.7 | 1.3 | 0.76 | 0 | 0.212 | 70 | None | Glossy |
| * | 87 | 8 | C | 1.7 | 0.9 | 0.53 | 0 | 0.200 | 65 | None | Glossy |
| * | 88 | 9 | C | 1.8 | 0.9 | 0.50 | 0 | 0.211 | 65 | None | Glossy |
| * | 89 | 10 | C | 1.9 | 1.5 | 0.80 | 0 | 0.203 | 70 | None | Glossy |
| * | 90 | 11 | C | 0.8 | 0.4 | 0.56 | 0 | 0.199 | 65 | None | Glossy |
| | 91 | 12 | C | 1.7 | 0.9 | 0.53 | 0 | 0.237 | 45 | None | Glossy |
| | 92 | 13 | C | 0.9 | 0.6 | 0.67 | 0 | 0.240 | 50 | None | Glossy |
| * | 93 | 8 | E | 1.7 | 1.3 | 0.76 | 24 | 0.186 | 55 | None | Near mirror |
| * | 94 | 8 | G | 1.7 | 1.3 | 0.76 | 44 | 0.197 | 55 | None | Near mirror |
| * | 95 | 8 | E | 1.7 | 1.3 | 0.76 | 63 | 0.185 | 35 | None | Near mirror |
| * | 96 | 8 | D | 1.7 | 1.3 | 0.76 | 84 | 0.184 | 20 | None | Near mirror |
| * | 97 | 8 | E | 1.7 | 1.3 | 0.76 | 100 | 0.173 | 5 | None | Near mirror |
| * | 98 | 9 | E | 1.8 | 0.9 | 0.50 | 52 | 0.205 | 35 | None | Near mirror |
| | 99 | 13 | D | 0.9 | 0.6 | 0.67 | 83 | 0.230 | 15 | None | Near mirror |

Table VIII clearly shows that the indexable inserts of the examples of the present invention having B/A calculated from the average thicknesses A μm and B μm of the outer layer of 0.9 or less are superior to those of the indexable inserts of the comparative examples in terms of the amount of flank wear and the fracture ratio, indicating that they achieve high wear resistance and high toughness simultaneously. The indexable inserts having a TiN layer instead of an alumina layer as the surface had a workpiece welded on the cutting edge and the workpiece after processing was clouded.

It is evident from above that the indexable inserts of the embodiments of the present invention exhibit effects superior to those of the indexable inserts of the comparative examples. Both high wear resistance (particularly at the flank face side) and the toughness could be achieved simultaneously.

Example 5

Figure 13:
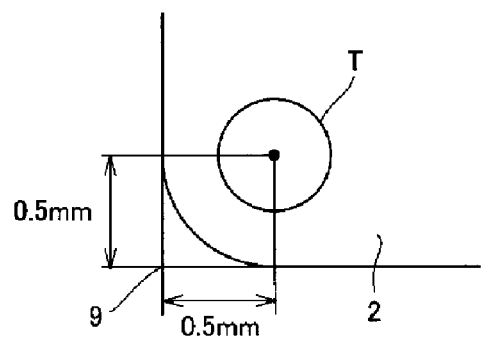
FIG. 13 is a schematic plan view showing one of corner portions of an indexable insert.

The residual stress of the alumina ($\alpha$-$Al_2O_3$ or $\kappa$-$Al_2O_3$) layer, which served as an outer layer, of each of indexable inserts Nos. 3, 4, 18, and 19 of EXAMPLE 1 was measured. The residual stress was measured in a region denoted as spot T (spot size: 0.5 mm in diameter) in FIG. 13 near a corner (since the edge processing was actually conducted, the corner was a hypothetical corner) 9 involved in cutting on the rake face side of each of the indexable inserts (to be specific, the sin² ψ method using an X-ray stress analyzer described above was employed). This measurement region is representative of portions on the rake face involved in cutting.

From indexable insert No. 18, three types of indexable inserts (indexable inserts Nos. 18-2, 18-3, and 18-4) to which different residual stresses were introduced by changing the conditions of blasting employed as the processing method were prepared. The residual stress of each indexable insert was measured as described above. Similarly, from indexable insert No. 19, three types of indexable inserts (indexable inserts Nos. 19-2, 19-3, and 19-4) to which different residual stresses were introduced were prepared, and the residual stress of each indexable insert was also measured. The results are shown in Table IX.

The amount of flank wear and the fracture ratio of each of these indexable inserts were measured as in EXAMPLE 1. The results are also shown in Table IX. The asterisked samples in Table IX are examples of the present invention and other samples are comparative examples.

TABLE IX

|   | Inserts Nos. | Residual stress(GPa) | Fracture ratio(%) | Amount of flank wear(mm) |
|---|---|---|---|---|
|   | 3 | 0.2 | 85 | 0.214 |
| * | 18 | −0.2 | 40 | 0.208 |
| * | 18-2 | −1.1 | 25 | 0.205 |
| * | 18-3 | −2.8 | 10 | 0.201 |
|   | 18-4 | 0.0 | 55 | 0.208 |
|   | 4 | 0.2 | 90 | 0.200 |
|   | 19 | −0.1 | 40 | 0.196 |
|   | 19-2 | −1.3 | 20 | 0.196 |
|   | 19-3 | −3.1 | 10 | 0.192 |
|   | 19-4 | 0.0 | 60 | 0.196 |

Table IX clearly shows that excellent toughness can be exhibited when the alumina layer serving as the outer layer has a compressive stress in the region of the rake face involved in cutting. In particular, it was confirmed that the toughness (resistance to fracture) was further improved as the compressive stress became larger.

Example 6

Figure 14:
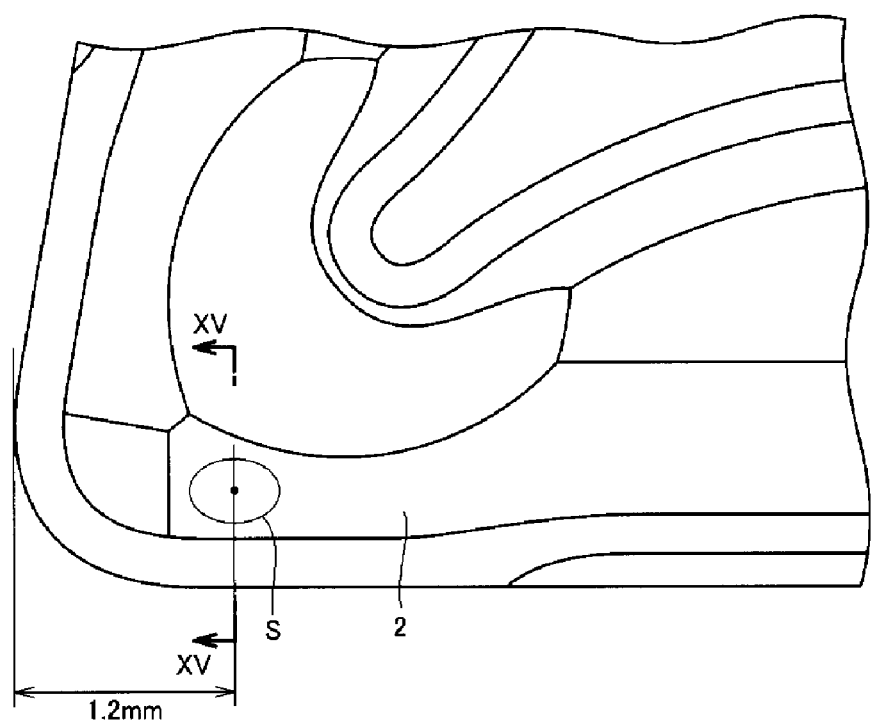
FIG. 14 is a schematic plan view showing one of acute corners of an indexable insert.
Figure 15:
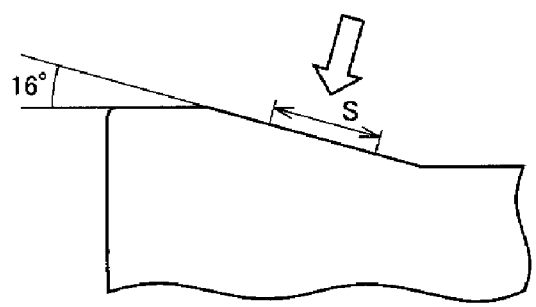
FIG. 15 is a schematic cross-sectional view taken along line XV-XV in FIG. 14.

The residual stress of the alumina (α-Al$_2$O$_3$ or κ-Al$_2$O$_3$) layer, which served as an outer layer, of each of indexable inserts Nos. 33, 34, 38, and 40 of EXAMPLE 2 was measured. The residual stress was measured in a region (this region is part of an inclined flat surface at an inclination angle of 16° constituting a chip breaker as shown in a cross-sectional view of FIG. 15 taken along line XV-XV in FIG. 14) denoted as spot S (spot size: 0.5 mm in diameter) in FIG. 14 near a corner involved in cutting on the rake face side of each of the indexable insert, the measurement being conducted in a perpendicular direction shown by the arrow in FIG. 15 (perpendicular with respect to the inclined flat surface) (to be specific, the sin² ψ method using an X-ray stress analyzer described above was employed). This measurement region is representative of portions on the rake face involved in cutting.

From indexable insert No. 38 described above, three types of indexable inserts (indexable inserts Nos. 38-2, 38-3, and 38-4) to which different residual stresses were introduced by changing the conditions of blasting employed as the processing method were prepared. The residual stress of each indexable insert was measured as described above. Similarly, from indexable insert No. 40, three types of indexable inserts (indexable inserts Nos. 40-2, 40-3, and 40-4) to which different residual stresses were introduced were prepared, and the residual stress of each indexable insert was also measured. The results are shown in Table X.

The amount of flank wear and the fracture ratio of each of these indexable inserts were measured as in EXAMPLE 2. The results are also shown in Table X. The asterisked samples in Table X are examples of the present invention and other samples are comparative examples.

TABLE X

|   | Inserts Nos. | Residual stress(GPa) | Fracture ratio(%) | Amount of flank wear(mm) |
|---|---|---|---|---|
|   | 33 | 0.2 | 100 | 0.248 |
| * | 38 | −0.3 | 65 | 0.237 |
| * | 38-2 | −1.3 | 45 | 0.235 |
| * | 38-3 | −3.3 | 20 | 0.232 |
|   | 38-4 | 0.1 | 75 | 0.237 |
|   | 34 | 0.3 | 90 | 0.298 |
| * | 40 | −0.2 | 60 | 0.297 |
| * | 40-2 | −0.9 | 40 | 0.295 |
| * | 40-3 | −2.2 | 20 | 0.290 |
|   | 40-4 | 0.0 | 75 | 0.298 |

Table X clearly shows that excellent toughness can be exhibited when the alumina layer serving as the outer layer has a compressive stress in the region of the rake face involved in cutting. In particular, it was confirmed that the toughness (resistance to fracture) was further improved as the compressive stress became larger.

Example 7

Figure 16:
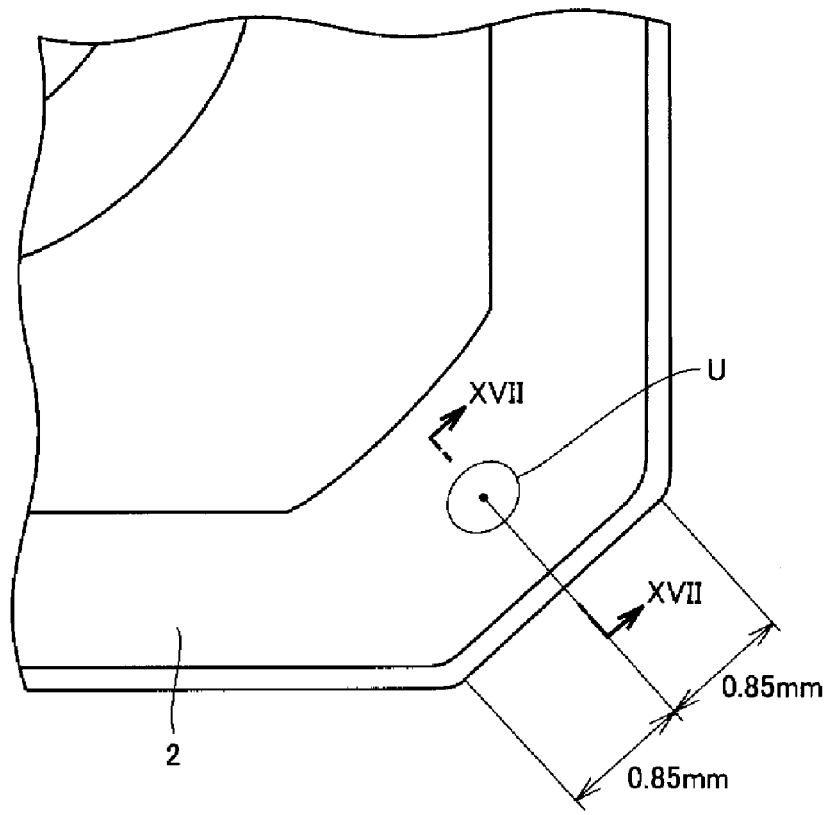
FIG. 16 is a schematic plan view showing one of different corner portions of an indexable insert.
Figure 17:
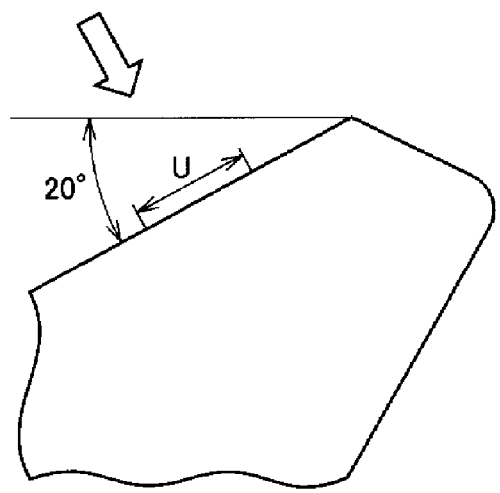
FIG. 17 is a schematic cross-sectional view taken along line XVII-XVII in FIG. 16.

The residual stress of the alumina (α-Al$_2$O$_3$ or κ-Al$_2$O$_3$) layer, which served as an outer layer, of each of indexable inserts Nos. 54, 55, and 63 of EXAMPLE 3 was measured. The residual stress was measured in a region (this region is part of an inclined flat surface at an inclination angle of 20° constituting a chip breaker as shown in a cross-sectional view of FIG. 17 taken along line XVII-XVII in FIG. 16) denoted as spot U (spot size: 0.5 mm in diameter) in FIG. 16 near a corner involved in cutting on the rake face side of each of the indexable insert, the measurement being conducted in a perpendicular direction shown by the arrow in FIG. 17 (perpendicular with respect to the inclined flat surface) (to be specific, the sin² ψ method using an X-ray stress analyzer described above was employed). This measurement region is representative of portions on the rake face involved in cutting.

From indexable insert No. 63 described above, three types of indexable inserts (indexable inserts Nos. 63-2, 63-3, and 63-4) to which different residual stresses were introduced by changing the conditions of blasting employed as the processing method were prepared. The residual stress of each indexable insert was measured as described above. Similarly, from indexable insert No. 64, three types of indexable inserts (indexable inserts Nos. 64-2, 64-3, and 64-4) to which different residual stresses were introduced were prepared, and the residual stress of each indexable insert was also measured. The results are shown in Table XI.

The amount of flank wear and the fracture ratio of each of these indexable inserts were measured as in EXAMPLE 3. The results are also shown in Table XI. The asterisked samples in Table XI are examples of the present invention and other samples are comparative examples.

TABLE XI

| Inserts Nos. | Residual stress(GPa) | Fracture ratio(%) | Amount of flank wear(mm) |
|---|---|---|---|
| 54 | 0.2 | 90 | 0.231 |
| * 63 | −0.2 | 60 | 0.195 |
| * 63-2 | −1.9 | 40 | 0.194 |
| * 63-3 | −3.1 | 20 | 0.191 |
| 63-4 | 0.1 | 70 | 0.195 |
| 55 | 0.2 | 90 | 0.218 |
| * 64 | −0.4 | 60 | 0.191 |
| * 64-2 | −1.2 | 45 | 0.188 |
| * 64-3 | −2.8 | 20 | 0.186 |
| 64-4 | 0.0 | 70 | 0.190 |

Table XI clearly shows that excellent toughness can be exhibited when the alumina layer serving as the outer layer has a compressive stress in the region of the rake face involved in cutting. In particular, it was confirmed that the toughness (resistance to fracture) was further improved as the compressive stress became larger.

Example 8

The residual stress of the alumina ($\alpha$-$Al_2O_3$) layer, which served as an outer layer, of each of indexable inserts Nos. 78, 81, 86, and 90 of EXAMPLE 4 was measured. The residual stress was measured in a region denoted as spot T (spot size: 0.5 mm in diameter) in FIG. 13 near a corner (since the edge processing was actually conducted, the corner was a hypothetical corner) 9 involved in cutting on the rake face side of each of the indexable inserts (to be specific, the $\sin^2 \psi$ method using an X-ray stress analyzer described above was employed). This measurement region is representative of portions on the rake face involved in cutting.

From indexable insert No. 86, three types of indexable inserts (indexable inserts Nos. 86-2, 86-3, and 86-4) to which different residual stresses were introduced by changing the conditions of blasting employed as the processing method were prepared. The residual stress of each indexable insert was measured as described above. Similarly, from indexable insert No. 90, three types of indexable inserts (indexable inserts Nos. 90-2, 90-3, and 90-4) to which different residual stresses were introduced were prepared, and the residual stress of each indexable insert was also measured. The results are shown in Table XII.

The amount of flank wear and the fracture ratio of each of these indexable inserts were measured as in EXAMPLE 4. The results are also shown in Table XII. The asterisked samples in Table XII are examples of the present invention and other samples are comparative examples.

TABLE XII

| Inserts Nos. | Residual stress(GPa) | Fracture ratio(%) | Amount of flank wear(mm) |
|---|---|---|---|
| 78 | 0.2 | 100 | 0.244 |
| * 86 | −0.1 | 70 | 0.212 |
| * 86-2 | −0.4 | 55 | 0.210 |
| * 86-3 | −1.8 | 20 | 0.209 |
| 86-4 | 0.0 | 80 | 0.212 |
| 81 | 0.2 | 95 | 0.221 |
| * 90 | −0.1 | 65 | 0.199 |
| * 90-2 | −0.9 | 45 | 0.197 |
| * 90-3 | −2.3 | 20 | 0.195 |
| 90-4 | 0.0 | 75 | 0.199 |

Table XII clearly shows that excellent toughness can be exhibited when the alumina layer serving as the outer layer has a compressive stress in the region of the rake face involved in cutting. In particular, it was confirmed that the toughness (resistance to fracture) was further improved as the compressive stress became larger.

While the present invention has been described by way of embodiments and examples above, the present invention also anticipates various other combinations of the embodiments and examples.

It should be understood that the embodiments and examples disclosed herein are merely illustrative and in no way limit the scope of the invention. The scope of the invention is defined by the appended claims, not the preceding disclosure, and includes all modifications and alterations within the scope defined by the appended claims and equivalents thereof.

The invention claimed is:

1. An indexable insert comprising a substrate and a coating layer formed on the substrate, wherein
the substrate has at least one flank face and at least one rake face,
the flank face and the rake face are connected to each other with an edge line therebetween,
the coating layer includes an inner layer constituted by one or more layers and an outer layer formed on the inner layer,
the innermost layer constituting the inner layer in contact with the substrate is composed of a compound containing at least one element selected from the group consisting of Group IVa elements, Group Va elements, and Group VIa elements in the periodic table, and Al and Si; and at least one element selected from the group consisting of carbon, nitrogen, oxygen, and boron, and the uppermost layer of the inner layer in contact with the outer layer is composed of a compound at least containing Ti and at least one of nitrogen and boron, and excluding carbon, and the layer other than the innermost layer and the uppermost layer is composed of a compound containing at least one element selected from the group consisting of Group IVa elements, Group Va elements, and Group VIa elements in the periodic table, and Al and Si; and carbon or a combination of carbon and at least one element selected from the group consisting of nitrogen, oxygen, and boron,
the outer layer is constituted by an alumina layer or an alumina-containing layer, and
in a region involved in cutting, the outer layer satisfies B/A$\leq$0.9 where A $\mu$m is the average thickness at the flank face side and B $\mu$m is the average thickness at the rake face side,
wherein a compressive stress of the rake face is larger than the compressive stress of the flank face.

2. The indexable insert according to claim 1, wherein the compound at least containing titanium and at least one of nitrogen and boron and exculding carbon is titanium boronitride represented by $TiB_XN_Y$ (where X and Y are atom. % satisfying 0.001<X/(X+Y)<0.04).

3. The indexable insert according to claim 1, wherein the compound at least containing titanium and at least one of nitrogen and boron and excluding carbon is titanium oxyboronitride represented by $TiB_XN_YO_Z$ (where X, Y, and Z are atom. % satisfying 0.0005<X/(X+Y+Z)<0.04 and 0<Z/(X+Y+Z)<0.5).

4. The indexable insert according to claim 1, wherein the outer layer is not formed or only partly formed on an edge line portion involved in cutting.

5. The indexable insert according to claim 1, wherein the coating layer has a thickness of 0.05 μm or more and 30 μm or less.

6. The indexable insert according to claim 1, wherein the substrate is composed of any one of a cemented carbide, a cermet, a high-speed steel, a ceramic, a cubic boron nitride sintered compact, a diamond sintered compact, and a silicon nitride sintered compact.

7. An indexable insert comprising a substrate and a coating layer formed on the substrate, wherein
the substrate has at least two flank faces, at least one rake face, and at least one corner,
the flank faces and the rake face are connected to one another with an edge line therebetween,
the corner is the point of intersection of the two flank faces and the rake face,
the coating layer includes an inner layer constituted by one or more layers and an outer layer formed on the inner layer,
the innermost layer constituting the inner layer in contact with the substrate is composed of a compound containing at least one element selected from the group consisting of Group IVa elements, Group Va elements, and Group VIa elements in the periodic table, and Al and Si; and at least one element selected from the group consisting of carbon, nitrogen, oxygen, and boron, and the uppermost layer of the inner layer in contact with the outer layer is composed of a compound at least containing Ti and at least one of nitrogen and boron and excluding carbon, and the layer other than the innermost layer and the uppermost layer is composed of a compound containing at least one element selected from the group consisting of Group IVa elements, Group Va elements, and Group VIa elements in the periodic table, and Al and Si; and carbon or a combination of carbon and at least one element selected from the group consisting of nitrogen, oxygen, and boron,
the outer layer is constituted by an alumina layer or an alumina-containing layer, and
on a straight line that passes through the corner, bisects the angle formed on the rake face by the two flank faces constituting the corner, and extends from the rake face to an intersection line between the two flank faces, the outer layer satisfies $B/A \leqq 0.9$, where the average thickness of a segment region 0.5 mm or more and 1 mm or less from the corner toward the flank face side is A μm and the average thickness of a segment region 0.5 mm or more and 1 mm or less from the corner toward the rake face side is B μm,
wherein a compressive stress of the rake face is larger than the compressive stress of the flank face.

8. The indexable insert according to claim 7, wherein the compound at least containing titanium and at least one of nitrogen and boron and excluding carbon is titanium boronitride represented by $TiB_XN_Y$ (where X and Y are atom. % satisfying $0.001 < X/(X+Y) < 0.04$).

9. The indexable insert according to claim 7, wherein the compound at least containing titanium and at least one of nitrogen and boron and excluding carbon is titanium oxyboronitride represented by $TiB_XN_YO_Z$ (where X, Y, and Z are atom. % satisfying $0.0005 < X/(X+Y+Z) < 0.04$ and $0 < Z/(X+Y+Z) < 0.5$).

10. The indexable insert according to claim 7, wherein the outer layer is not formed or only partly formed on an edge line portion involved in cutting.

11. The indexable insert according to claim 7, wherein the coating layer has a thickness of 0.05 μm or more and 30 μm or less.

12. The indexable insert according to claim 7, wherein the substrate is composed of any one of a cemented carbide, a cermet, a high-speed steel, a ceramic, a cubic boron nitride sintered compact, a diamond sintered compact, and a silicon nitride sintered compact.

\* \* \* \* \*